United States Patent [19]

Bozler et al.

[11] Patent Number: 5,233,459
[45] Date of Patent: Aug. 3, 1993

[54] ELECTRIC DISPLAY DEVICE

[75] Inventors: Carl O. Bozler, Sudbury; Steven Rabe, West Roxbury, bot of Mass.

[73] Assignee: Massachusetts Institute of Technology, Cambridge, Mass.

[21] Appl. No.: 665,345

[22] Filed: Mar. 6, 1991

[51] Int. Cl.$^5$ ............................................. G02B 26/02
[52] U.S. Cl. .................................. 359/230; 359/227; 340/763
[58] Field of Search .............. 359/227, 230; 340/763, 340/764

[56] References Cited

U.S. PATENT DOCUMENTS

| | | | |
|---|---|---|---|
| 3,746,911 | 7/1973 | Nathanson et al. | 315/21 |
| 3,772,537 | 11/1983 | Clifford et al. | 200/181 |
| 3,897,997 | 8/1975 | Kalt | 350/161 |
| 3,989,357 | 11/1976 | Kalt | 350/161 |
| 4,074,253 | 2/1978 | Nadir | 340/324 |
| 4,094,590 | 7/1978 | Kalt | 350/269 |
| 4,208,103 | 6/1980 | Kalt et al. | 350/269 |
| 4,229,075 | 10/1980 | Ueda et al. | 350/269 |
| 4,235,522 | 11/1980 | Simpson et al. | 350/266 |
| 4,248,501 | 2/1981 | Simpson | 350/266 |
| 4,266,339 | 3/1981 | Kalt | 29/829 |
| 4,403,248 | 9/1983 | Te Velde | 358/62 |
| 4,529,620 | 7/1985 | Glenn | 427/88 |
| 4,695,837 | 9/1987 | Kalt | 340/763 |
| 4,729,636 | 3/1988 | Te Velde et al. | 350/269 |
| 4,741,599 | 5/1988 | Togo et al. | 350/269 |
| 4,805,038 | 2/1989 | Seligson | 358/296 |
| 4,807,967 | 2/1989 | Veenvliet et al. | 350/269 |
| 4,878,122 | 10/1989 | Glenn | 358/233 |
| 4,879,602 | 11/1989 | Glenn | 358/233 |
| 4,891,635 | 1/1990 | Hata | 340/783 |
| 4,948,708 | 8/1990 | Veenvliet et al. | 430/316 |
| 4,956,619 | 9/1990 | Hornbeck | 330/4.3 |

Primary Examiner—Rodney B. Bovernick
Assistant Examiner—James Phan
Attorney, Agent, or Firm—Hamilton, Brook, Smith & Reynolds

[57] ABSTRACT

A bistable electrostatic light valve display in which a movable electrode is disposed opposite a fixed electrode and is biased to move in a preferred direction upon application of an electric field across the electrodes to produce a light valve or light shutter. In one embodiment, the movable electrode is restrained at one end and coils about the fixed end in a preferential roll direction. The bias is achieved by inducing anisotropic stress or anisotropic stiffness. In another embodiment, the moveable electrode is restrained at both ends and is biased upwardly by anisotropic stress or stiffening.

23 Claims, 17 Drawing Sheets

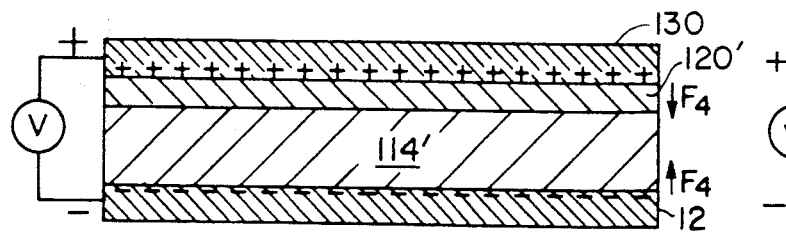 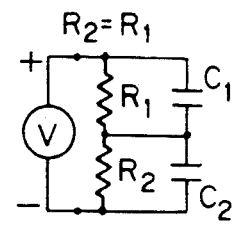
FIG. 17(a)  FIG. 17(b)
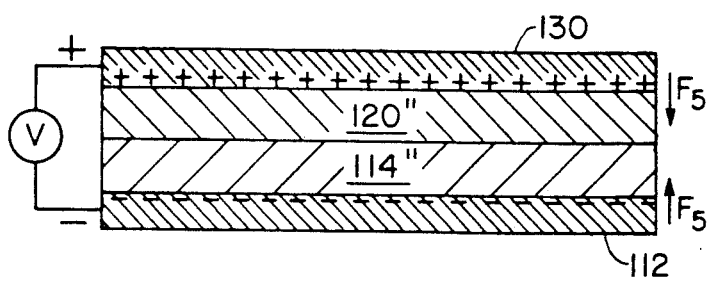 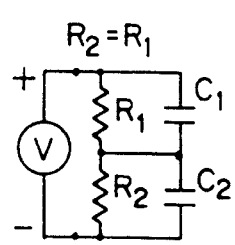
FIG. 18(a)  FIG. 18(b)
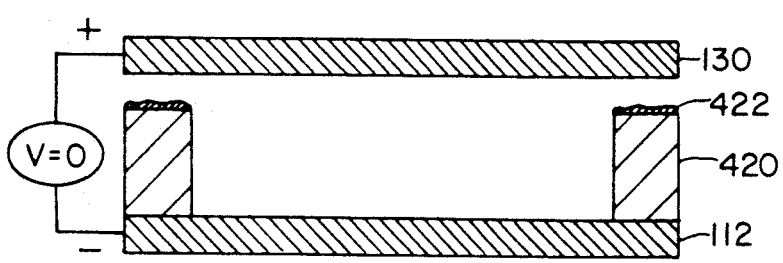
FIG. 19(a)
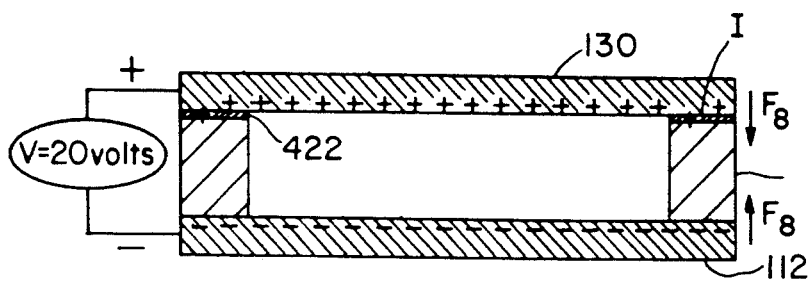
FIG. 19(b)

ELECTRIC DISPLAY DEVICE

BACKGROUND OF THE INVENTION

This invention relates to display devices and displays and, in particular, to a passive or active light valve or shutter for use in displays. Electric display devices convert electric signals transmitted from electric or electronic devices into optical signals that can be recognized by humans. The optical signal is displayed as an image in the form of digits, characters, or graphics. Electric displays are also divided into active or passive types. When the optical signal is displayed by light emission, the display is termed an active display, whereas when the display works by modulating incident light through reflection, scattering, interference, or similar phenomena, using an external light source it is termed a passive display.

Displays may be further subdivided into several further categories, as follows:
LCD liquid crystal display
ECD electrochemical display
EPID electrophoretic image display
SPD suspended particle display
TBD twisting ball display
PLZT transparent ceramics display; and
ELVD electrostatic light valve display.

An ELVD is described in U.S. Pat. No. 3,989,357 issued Nov. 2, 1976 to Charles G. Kalt. Kalt's ELVD is a passive device and consists of a fixed electrode to which a movable coiled resilient sheet electrode is attached with an insulating layer separating the two electrodes. The coiled electrode is caused to unroll upon application of an electric potential between the two electrodes. The coiled electrode thus acts as a light shutter.

The inner surface of the coiled electrode has a color or reflectivity that is different from that of the fixed electrode, in which case, the device to an observer changes hue or reflectivity when a potential is applied. Alternatively, the fixed electrode may be transparent to a selected portion of the electromagnetic spectrum and the coiled electrode may be opaque. In this case, the device is said to operate in the transmissive mode and a light source positioned behind the device would transmit light when no potential is applied and would not transmit light when a potential is applied.

Other patents pertaining to ELVD's are U.S. Pat. Nos. 3,897,997; 4,094,590; 4,235,522 and 4,248,501.

The above patents generally teach the use of metallized plastic sheets as the movable or coiled element. These sheets are formed into a roll using heat and a mandrel or by bonding two plastic sheets, one of which is prestressed in one direction before bonding. There are a number of problems associated with these approaches when considering manufacturing cost, reliability, temperature effects and electrical charge control in these devices. The methods described require individual handling of each shutter to form the roll and bond it to the fixed electrode. Some of the problems of handling are described in U.S. Pat. No. 4,094,590, which describes the formation of wrinkles. These prior art devices rely on the elastic properties of plastic, which is undesirable, since these properties can vary widely with temperature and humidity and often change as they age. The flexing characteristics of the movable electrode are determined by these elastic properties, therefore the threshold voltages are likely to drift. U.S. Pat. Nos. 4,235,522 and 4,248,501 describe some of the issues of charge control in the insulator. These problems are more severe than is indicated in the patents. Even small amounts of accumulation or drift of charge in the plastic materials described will cause large amounts of threshold drift in the light valves, which is undesirable for many applications.

SUMMARY OF THE INVENTION

A lower cost method for mass production of ELVD's is disclosed. The process uses film deposition methods and lithography for making the valves. This means that all of the electrodes can be made from thin films. The term "thin films" is used to denote a film formed of layers deposited by some type of atom by atom or molecule by molecule process, rather than layers produced by layering down relatively large particles. Except for electroplating processes, thin film deposition requires a vacuum or low pressure environment. In practice, this requires vacuum evaporation, sputtering or chemical vapor deposition (CVD), plasma deposition, molecular beam epitaxy (MBE), ion beam sputtering, or other similar process. Large numbers of shutters can be made simultaneously over large areas when using thin film and lithography techniques.

In general, therefore, the invention comprises an electrostatic light valve and a method of forming such a valve. The valve consists of a fixed electrode and a movable electrode with an insulative layer disposed on the first electrode and an insulative layer beneath the movable electrode, such that when the movable electrode is moved toward the fixed electrode by application of an electrostatic force, no metal-to-metal or metal-to-insulator contact occurs. Instead, the two insulative layers contact. In the transmissive mode, the fixed electrode is transparent and the movable electrode is opaque and acts like a shutter.

The two insulation films greatly reduce the transfer of charge from one electrode to another, compared to the case where only one insulation film is used between electrodes. The charge transfer reduces the holding force on the movable electrode and allows it to move away from the fixed electrode, thereby opening the shutter.

Preferably, the movable electrode is an anisotropically stressed or stiffened electrode. The anisotropic stress or stiffness causes the electrode to move in a preferential direction, i.e., where the stress is greater, or perpendicular to the direction of stiffening. The anisotropic stiffening may be induced by forming periodic corrugations in the electrode to stiffen the electrode in a direction orthogonal to the preferential direction. Anisotropic stress may be induced by forming the electrode in a deposition process which produces anisotropic stress.

In a first embodiment the moveable electrode is a coilable electrode fixed at one end which rolls up in a preferred direction and unrolls upon application of an electric field across the electrodes. In an alternate embodiment the moveable electrode is a deformable membrane fixed at both ends. An array of anisotropically stiffened electrostatically movable electrodes separated from a fixed electrode by insulative layers on opposing faces of the electrodes is formed in accordance with the invention, as follows:

A thin transparent conductive layer is formed on a suitable substrate, such as glass. A photoresist layer is formed over the conductive layer and patterned using conventional lithography techniques. The exposed conductive layer is then etched away, leaving individual electrode or pixel areas; using the resist as a mask. The mask is removed and the patterned film of electrodes is then covered with a thin transparent insulator film, such as a film of silicon dioxide. Edges of the electrodes where contacts will be formed are suitably masked prior to forming the insulator film.

Another layer of photoresist is formed over the patterned structure and patterned so as to leave resist over the individual electrode areas. The substrate with resist is then heated to a temperature of about 400° C. in air for a short period, after which a third resist layer is applied and patterned to leave a series of resist regions extending across the width of the electrode regions. The structure is again heated at elevated temperature for a short period. The series of resist regions form the anisotropic stiffening corrugations and a release layer for an overlying coilable electrode formed by depositing and patterning successive layers of: (i) a low stress insulating film, (ii) a conductive film having stress of one type, i.e., compressive, and (iii) a conductive film having stress of opposite type (tensile). An optional low stress protective coating is then formed over this structure and the structure is patterned to define contact areas where contact metallization is deposited. Photoresist and etching is then used to further define pixel areas and to completely remove the resist release layer, whereupon the anisotropically formed movable electrodes coil up in the intended roll direction. Coiling occurs because the electrode is formed from a bottom low stress insulative layer, and a combined conductive compressive/tensile stress layer and a top low stress protective layer. Corrugations in the electrode provide lateral stiffness to prevent the electrode from curling perpendicular to the intended roll.

The above and other features and advantages of the invention will now be described in detail in connection with the following drawings.

BRIEF DESCRIPTION OF THE DRAWINGS

FIG. 17(a) is a cross-sectional view, as in FIG. 16(a), in which $R_2 = R_1$ and the insulator materials are different.

FIG. 18(a) is a cross-sectional view, as in FIG. 16(a) in which $R_2 = R_1$ and the insulator material and thickness is equal.

FIGS. 16(b), 17(b) and 18(b) are equivalent circuits of the ELVD's of FIGS. 16(a), 17(a) and 18(a), respectively.

FIGS. 19(a) and 19(b) are cross-sectional views (voltage off) 19(a) and (voltage on) 19(b) of an ELVD with a rail or spacer gap construction.

DETAILED DESCRIPTION OF THE INVENTION

Referring now to FIGS. 1(a)-1(j), a preferred process for forming the display apparatus of the invention will be described in connection therewith.

The process depends somewhat on the substrate material used. Because glass is inexpensive and commonly available with flat smooth surfaces, it presently is a preferred substrate and has therefore been chosen as the substrate material for this description. Other prospective equivalents may comprise fused quartz, or in reflective mode operation, single crystal silicon, metals, or the like. The first step [FIG. 1(a)], after cleaning and inspection to determine that the substrate 10 has sufficiently good surface quality, is to coat the substrate with a thin transparent conductive layer such as 1000-3000 Å indium tin oxide (ITO). A sputtering machine with a sputtering target composed of indium oxide with about 10% tin oxide may be used to form the transparent conductor film layer 12. Note that ultra-thin transparent films of metals, such as, gold, platinum, silver or tungsten may be used in place of the ITO film. The ITO coated glass plate is then over coated with photoresist and the resist is patterned using conventional lithography techniques and the exposed ITO is then etched with an ITO etch using the photoresist as a mask (not shown). This step defines the lower or fixed electrode. Next, the patterned ITO film 12 is covered with a high resistance film 14, such as a silicon dioxide film using a chemical vapor deposition system. Preferably, the thickness of film 12 ranges from about 50 Å to 5000 Å but may extend up to 25,000 Å as desired. Alternatively, one could form the high resistance film of silicon nitride deposited in a sputtering machine using a silicon target and nitrogen or a nitrogen argon mixture as the sputter gas. As a further alternative, one could deposit silicon dioxide using a sputtering or evaporation system.

Figure 1A:
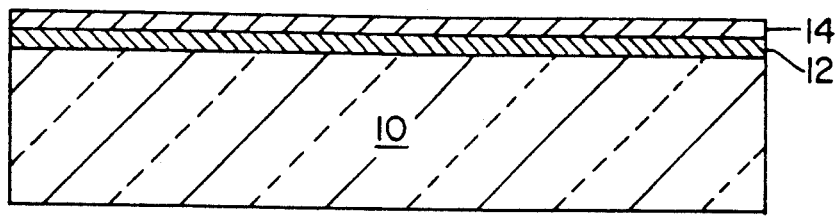
FIG. 1(a)-1(j) are a series of schematic sectional views showing the steps in fabricating a valve for an electrostatic light valve display (ELVD) in accordance with the invention.
Figure 1B:
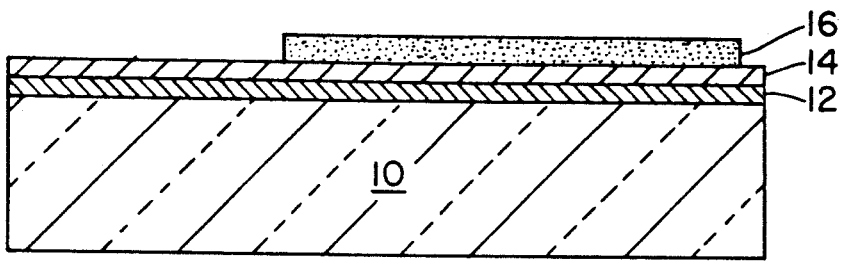
Figure 1C:
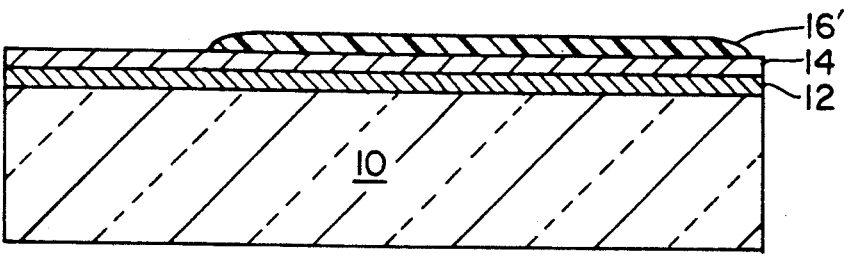
Figure 1D:
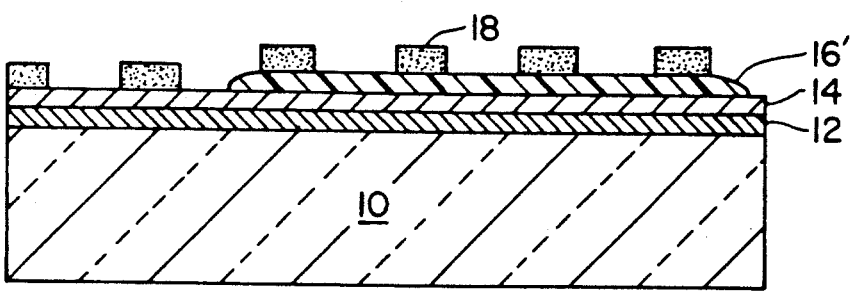
Figure 1E:
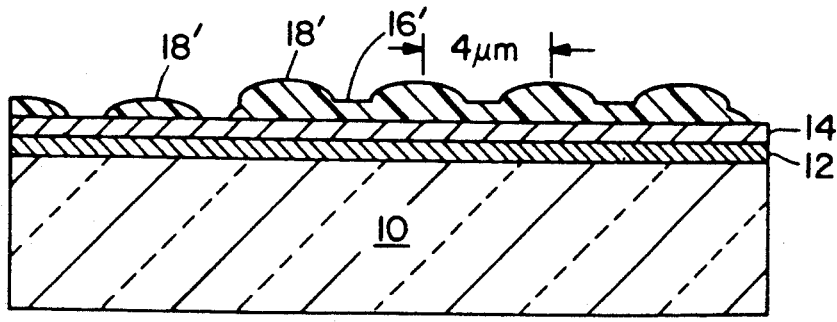
Figure 1F:
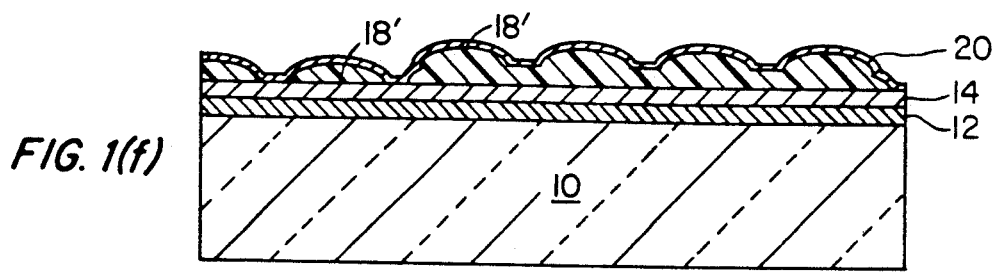
Figure 1G:
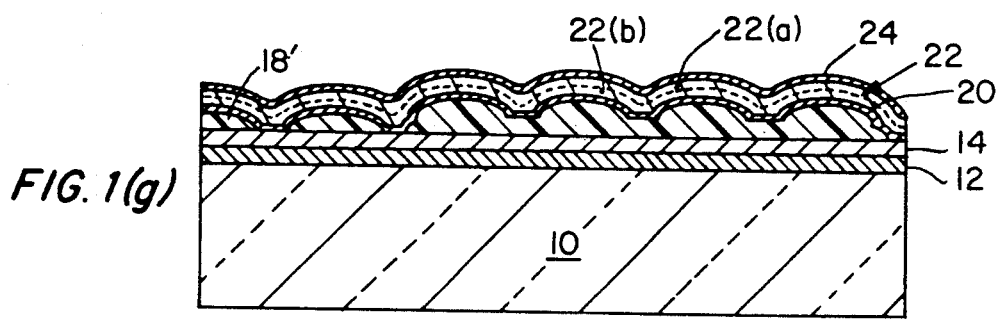
Figure 1H:
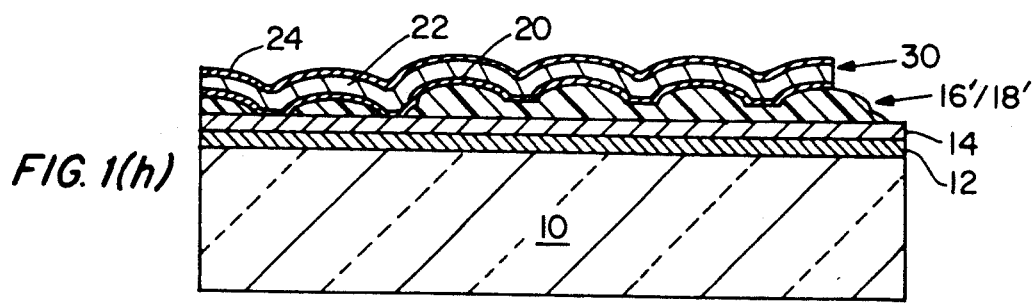
Figure 1I:
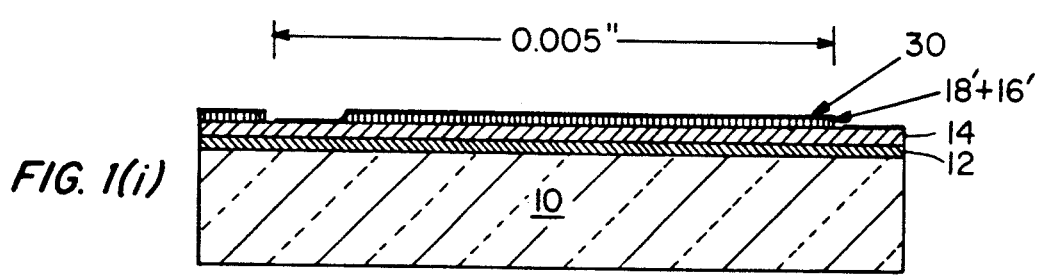

Before depositing the silicon dioxide film 14, the edges of the plate where the wire contacts will be made are covered with masking strips (not shown) to block deposition. The silicon dioxide film 14 provides a high resistivity layer which will be disposed between the fixed transparent electrode conductor 12 and the top coilable electrode to be formed next. The structure is then coated with photoresist 16 (FIG. 1b) having a thickness around 3000 Å using conventional techniques. The photoresist may be a negative or positive resist and the positive resist is comprised of a base resin (Novolak) and a photoactive compound and is patterned, again using conventional techniques. leaving resist in areas where release in an overlying film is required. A resist, such as, the photoresist sold under the name "AZ 1350B" has been used with good results. The structure with resist is then baked at 400° C. for one minute in air. FIG. 1(c) transforming resist layer into a smooth hard layer 16'. This bake process partially carbonizes the resist making it very hard and inert. The films formed on the baked resist can have the same properties as films on glass with a wide variety of materials using various deposition processes. A second layer of resist for forming corrugations is then applied as before, and patterned in a 4 micron period grating of resist regions 18 over the previously baked resist areas [FIG. 1(d)]. The structure is again baked at 400° C. for one minute forming a second smooth periodic hard resist structure 18' [FIG. 1(e)]. This second resist layer 18' provides the corrugations in an overlying electrode formed in the next steps. The two resist layers 16' and 18' together provide the release layer for the overlying electrode. The patterned structure is then coated with a 300 Å thick film 20 of high resistivity material, such as silicon dioxide or other alternative material, as before. The stress of this film 20 FIG. 1(f) must be low compared with the overlying layers or have compressive stress. Since the amount of stress will affect the tightness of the coil of the microshutter, the level of stress must be carefully controlled. Stress control is achieved by carefully selecting appropriate deposition processes and conditions. For example, silicon dioxide deposits with a large tensile stress in an atmospheric CVD reactor; but deposits with a smaller compressive stress using vacuum evaporation. The amount of stress will vary depending on deposition rate, temperature and pressure. The insulative film 20 is then coated with a film 22(b) FIG. 1(g) of sputtered tungsten having compressive stress, and then a second film 22(a) having tensile stress with both films together 22 having a thickness of 500 Å and a net stress which is low compared with the stress of each individual film [FIG. 1(g)]. Once again, the level of stress must be carefully controlled because it will affect the tightness of the coil of the rolled electrode. The stress in the sputtered tungsten may be adjusted by changing the sputtering power and gas (argon) pressure. After deposition of the tungsten films 22, the structure is coated with an optional 100 Å film 24 of sputtered nickel, aluminum, or silicon dioxide [FIG. 1(g)] to protect the tungsten from the etchants of the succeeding processing steps.

Figure 1J:
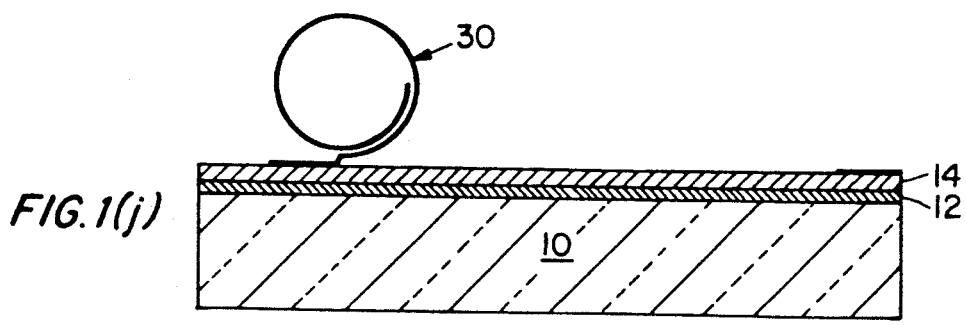

Next, the structure is patterned with photoresist to define the contact areas where wire bonds will be made. Aluminum is then evaporated on the contact surface and lifted off elsewhere to provide the bonding pads 26. (See plan view of FIG. 2.) Photoresist is again applied and patterned to define the pixel areas 28. Part of the pixel area overlays the release layer and part does not. The patterned structure is then etched using a nickel or aluminum etch (nitric acid for nickel or phosphoric/acetic/nitric solution for aluminum) for coating 24 and then introduced into a freon ($CF_4$) plasma which etches through the tungsten 22 and the silicon dioxide 20. The plasma will also etch about 100 Å into the underlying baked photoresist layers 18' and 16' or in the thicker silicon dioxide layer 14. The structure is then exposed to atomic oxygen at 300° C. in a down stream asher. In several minutes the oxygen removes the release layers 18' and 16' and the movable electrode 30 [FIG. 1(i)] coils up. The structure after coiling is shown in FIG. 1(j). Coiling occurs because the bottom silicon dioxide 20 has low stress, the first tungsten layer 22(b) has compressive stress and the second tungsten layer 22(a) has tensile stress and the nickel film 24 has low stress. The structure is now ready for packaging in a hermetic package and for making the wire connections at the edge of the electrodes.

The corrugations provide the lateral stiffness to keep the film from curling perpendicular to the intended roll direction. The periodicity and depth of the corrugations are important parameters in the fabrication of the display structure. There may be advantages in making the corrugations very deep. Deeper corrugations make the film more flexible and this would allow the use of thicker stiffer materials to be used in the film. A thicker film may be stronger. Another advantage of deeper corrugations would be lower reflectivity of incident light. Light passing to the bottom of a corrugation has a low probability of being reflected back out, especially if the material in the film is somewhat light absorbing.

Instead of using corrugations for anisotropic stiffening, a deposition process, such as evaporation or ion bombardment at an angle, may be used to induce anisotropic stress.

Note that in the process just described, the size of the coil, the voltage required to roll it out, the holding voltage, and the response time are important parameters in the design of particular devices. Assuming other parameters are held constant, some general rules can be given for these parameters. The larger the roll, the less voltage required to unroll the coil and the lower the holding voltage. The thicker the release layer, the higher the voltage required to roll out the film. The thicker the insulating layers, the higher the roll out voltage and the higher the holding voltage. The higher the differential stress in the two layers, the smaller the coil. The smaller the coil, the faster the roll up response. The roll out response time decreases as the roll out voltage increases.

Use of light weight or less dense moveable electrode material results in faster response. For example, use of graphite and diamond or diamond-like films instead of tungsten and silicon dioxide would produce a much faster opening and closing of the valve.

It is also possible to build the shutter so that the insulation film over the release layer is compressive and the metal film over the insultation film is tensile. When released this double layer will function in a way similar to the structures mode using two oppositely stressed tungsten films. An example would be compressive silicon dioxide and tensile magnesium.

Note also that deposited films generally have internal stress which will vary in direction and magnitude depending on deposition conditions. For example, evaporated pure titanium is compressive at thicknesses below 1000 Å. Adding oxygen to the film changes the stress to tensile. Also, sputtered tungsten deposits compressive at high power and 10 milliTorr argon pressure, and deposits tensile at low power and 15 milliTorr argon depending on the deposition system used. Some films have uniform stress, some films have stress which varies through film. By choosing the materials and deposition processes, one can generate structures where the first part of the film down is compressive and as deposition continues the stress gradually becomes tensile so that upon release, the film rolls up. Or one can form a single film in which the stress in the lower part is compressive and in the top part is tensile.

Figure 5A:
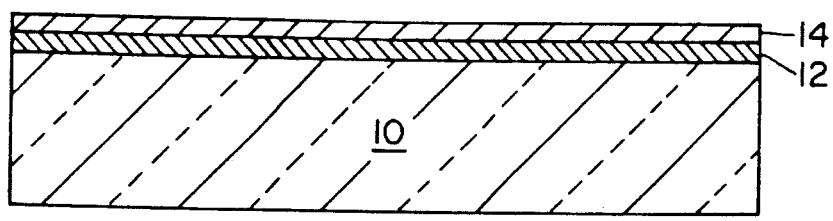
FIG. 5(a)-(j) are a series of schematic cross-sectional views showing steps in fabrication of an alternate embodiment of the invention.
Figure 5B:
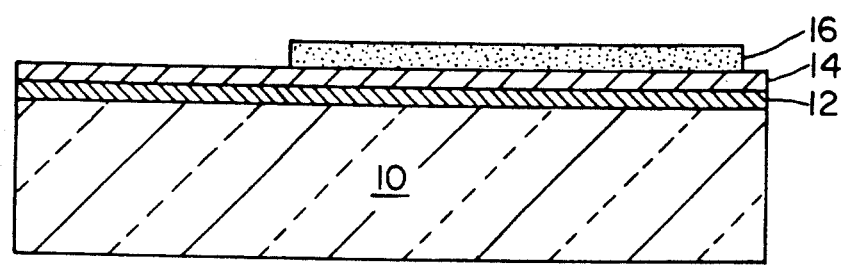
Figure 5C:
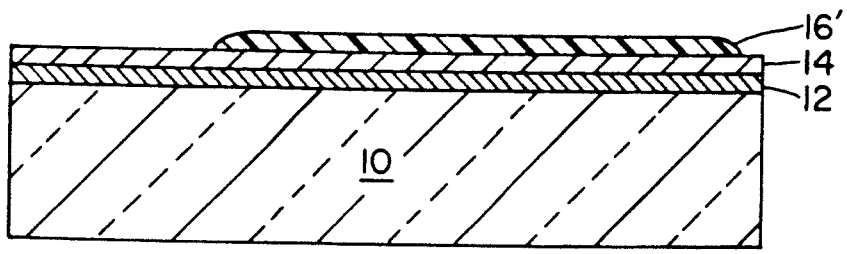
Figure 5D:
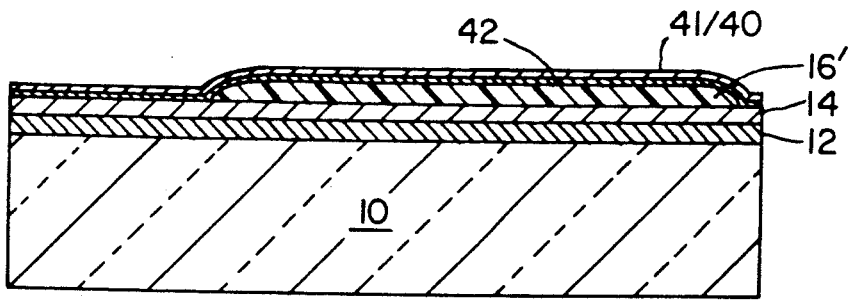
Figure 5E:
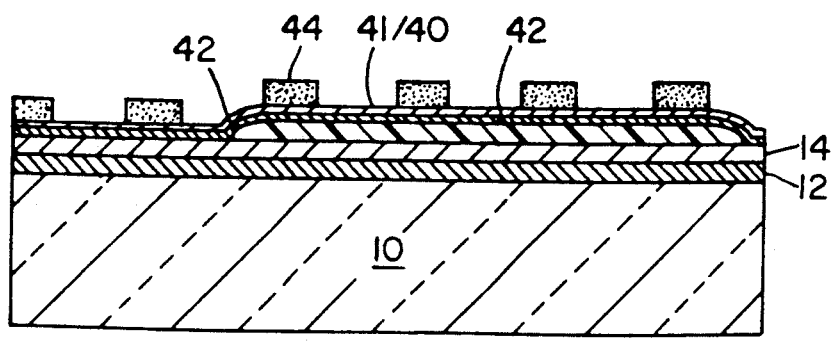
Figure 5F:
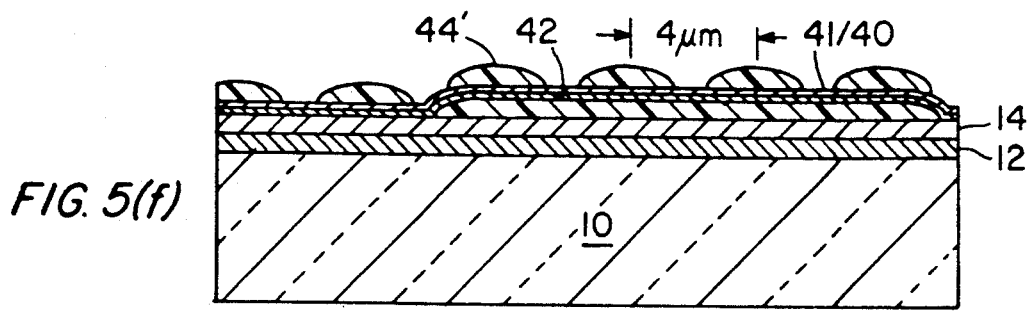
Figure 5G:
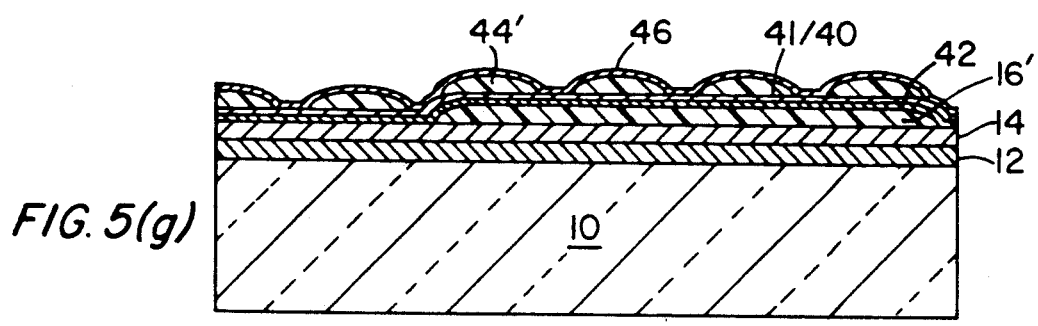
Figure 5H:
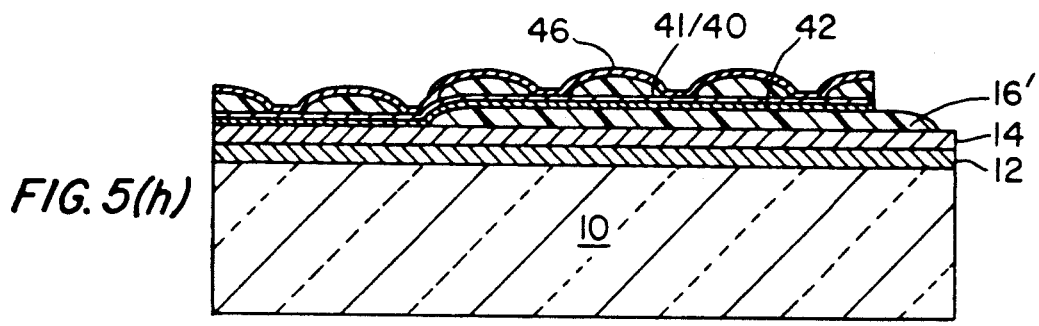
Figure 5I:
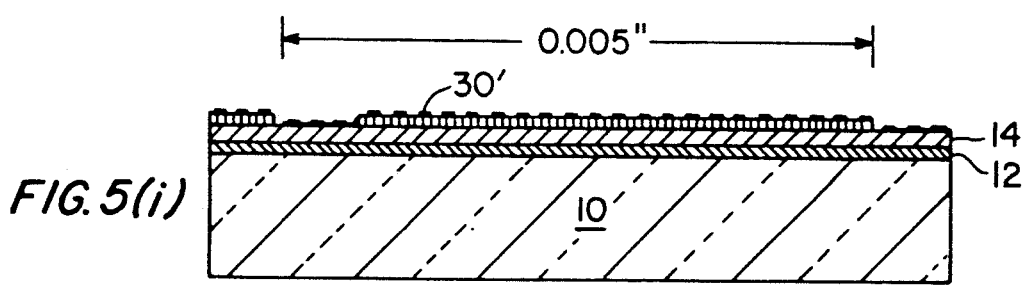
Figure 5J:
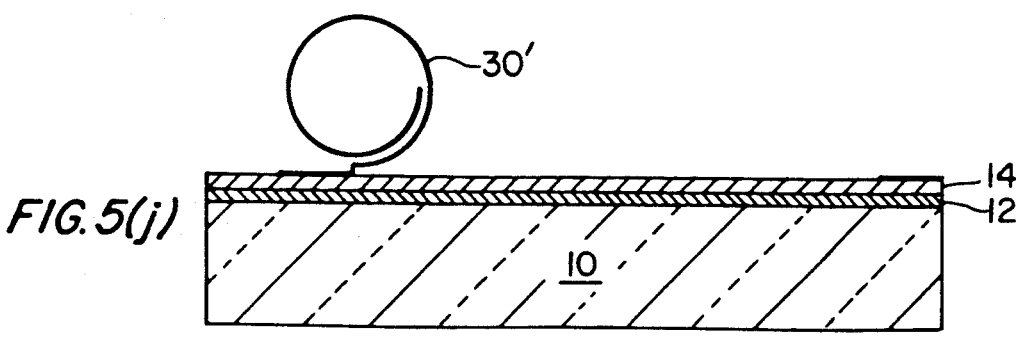

An alternate embodiment will now be described with the aid of FIGS. 5(a)-5(j). In this embodiment, ribs are formed on the movable electrode in place of corrugations to produce anisotropic stiffness. The first part of the fabrication procedure is the same as in the corrugated procedure previously described, including the choice of substrate 10 and coating and patterning with ITO 12 [FIG. 5(a)]. The ITO 12 is coated with silicon dioxide 14.50 Å to 5000 Å thick, deposited with a CVD system. The silicon dioxide 14 is removed from the edges of the structure where the wire contacts will be made using photolithography and etching. Next, the structure is coated with photoresist 16 having a thickness around 3000 Å using conventional techniques. The photoresist is patterned, again using conventional techniques, leaving resist in areas where release in an overlying film is required. The structure with resist is then baked at 400° C. for one minute. The resist layer 16' FIG. 5(c) provides the release layer for an overlying film. The patterned structure is then coated with a 300 Å thick film of CVD deposited silicon dioxide 42. The glass plate is then coated with two layers 40/41 of sputtered tungsten, the first film 41 having compressive stress, the second 40 having tensile stress. Since the amount of stress will effect the tightness of the coil of the micro shutter, the level of stress in both films must be carefully controlled [See FIG. 5(d)]. Next, the structure is coated with photoresist having a thickness around 6000 Å using conventional techniques. The photoresist 44 is patterned [FIG. 5(e)] with a 4 micron period grating with lines running perpendicular to the roll direction, again using conventional techniques, leaving resist 44 in areas where the ribs are desired. The structure with resist is then baked at 400° C. for one minute [FIG. 5(f)] and is coated with 300 Å evaporated silicon dioxide 46 [FIG. 5(g)]. After deposition of the oxide 46, the structure is patterned (not shown) with photoresist to define the contact areas where wire bonds will be made. Aluminum is then evaporated on the structure and lifted off except where required to provide the bonding pads. Photoresist is again applied and patterned to define the pixels [FIG. 5(h)]. Part of the pixel area overlays the release layer and part does not. The patterned structure is then etched using a freon plasma which etches through the silicon dioxide 46. The structure is then etched in oxygen plasma briefly to remove the baked photoresist 44'. The tungsten 41/40 and silicon dioxide 42 are etched in a freon plasma etch. The plasma will also etch about 100 < into the underlying baked photoresist layer 16' or in the thicker silicon dioxide layer 14. The structure is then exposed to atomic oxygen at 300° C. in a down stream asher. In several minutes, the oxygen removes the release layer 16' and the pixels coil up. The coiling occurs because the bottom tungsten layer 41 is compressive, while the top tungsten 40 is tensile and the silicon dioxide 42 is tensile, but much more flexible than the tungsten. The ribs 46 provide the lateral stiffness to keep the film from curling along the axis of the roll. The structure is now ready for packaging in a hermetic package and for making the wire connections at the edge of the array.

Figure 3:
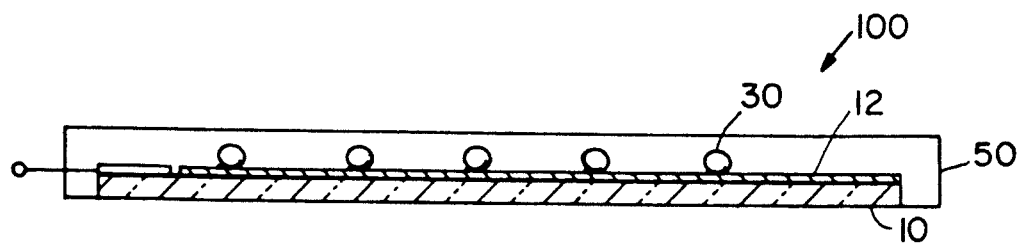
FIG. 3 is a sectional view along lines II—II of FIG. 2.

Preferably, the array 100, as shown in FIG. 3, is enclosed in a package, made, for example, of quartz or glass 50, which excludes water vapor and with an atmosphere that reduces sticking of the movable electrode to the fixed electrode and minimizes wear. One possible atmosphere would be dry nitrogen. Another is xenon, which is a much denser gas and would be good for reducing wear, since a dense gas would provide damping on the movable electrode.

Figure 2:
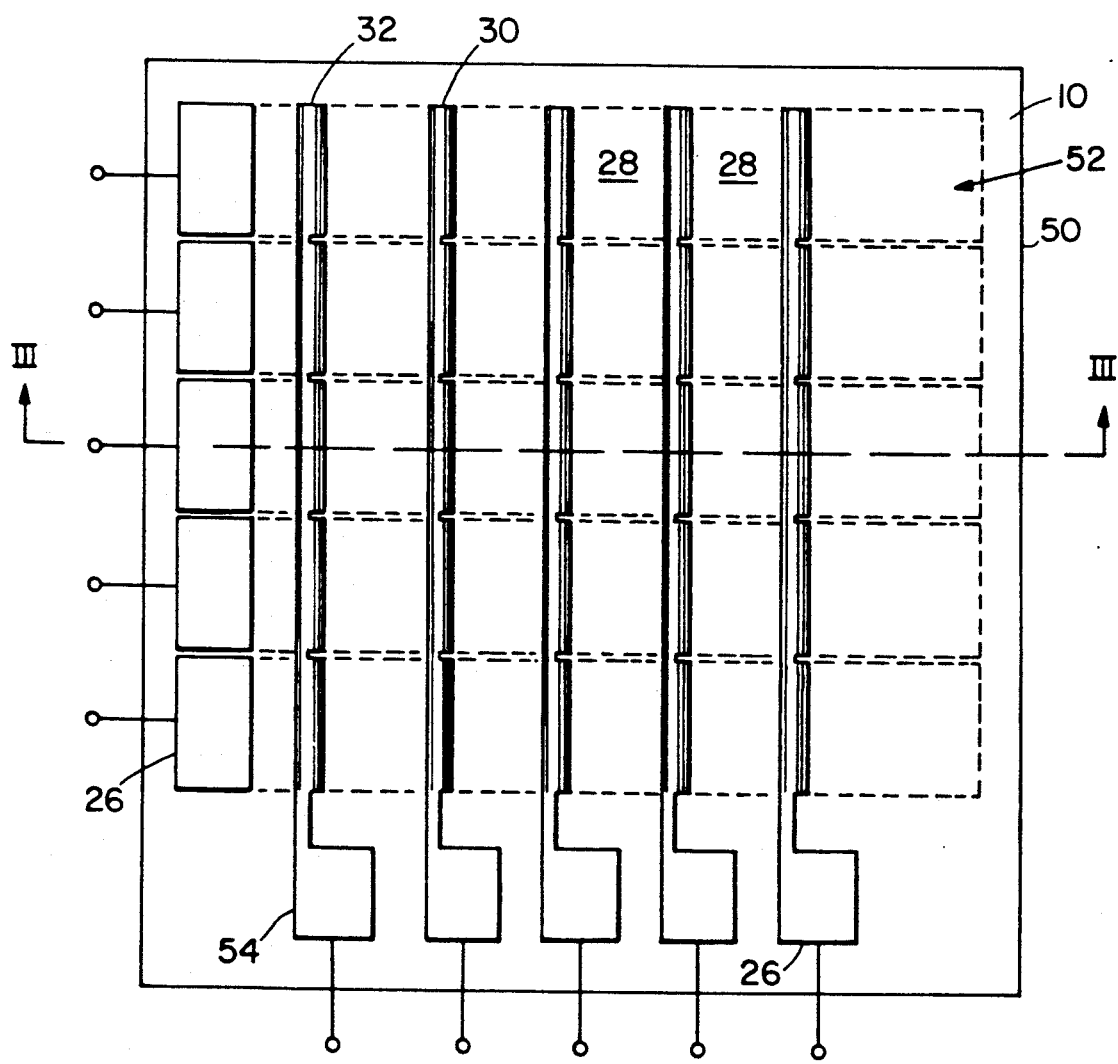
FIG. 2 is a schematic plan view of a 5×5 matrix array of ELVD's in which the pixel shutters are shown open.
Figure 4:
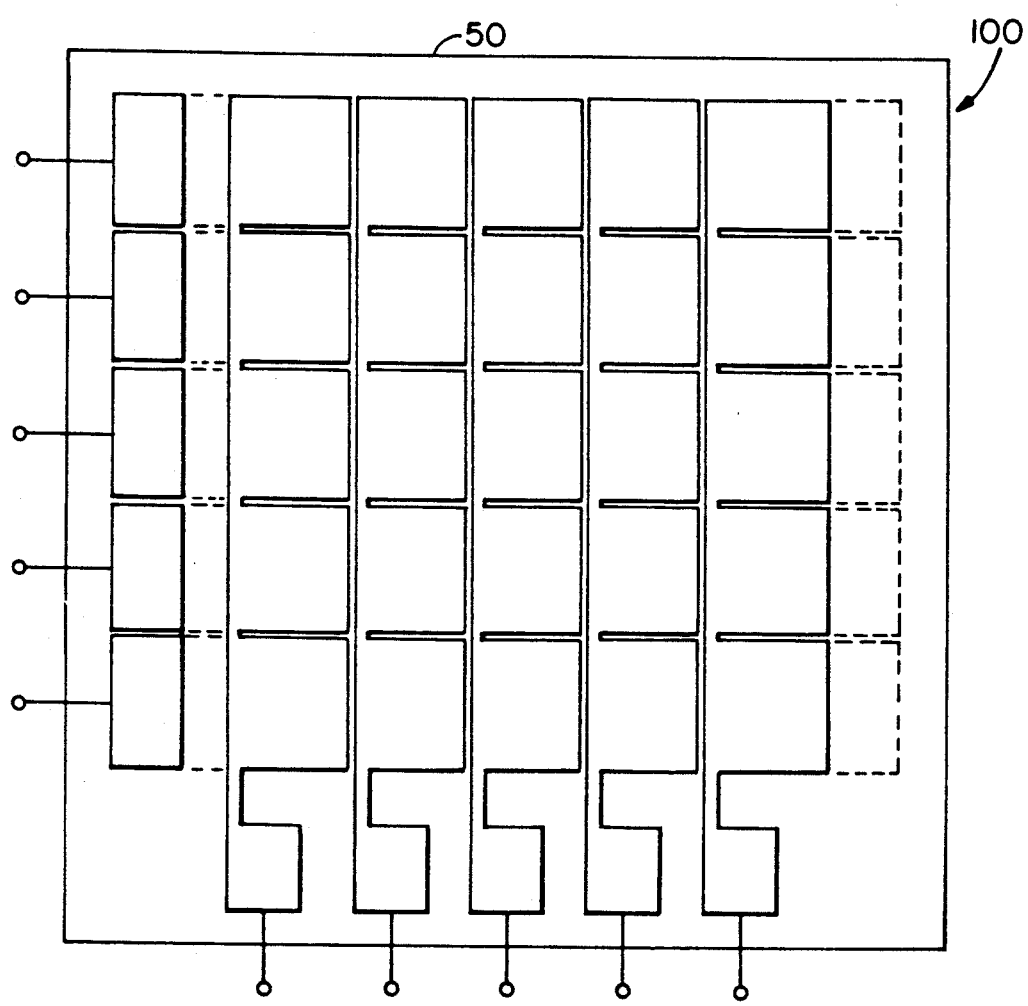
FIG. 4 is a view as in FIG. 2 showing the pixel shutters in the closed position.

Most of the applications for the display require having rows or arrays of devices. Television requires hundreds of rows and columns. In FIGS. 2-4, a 5×5 array or matrix 100 is shown to illustrate a preferred structure. In this array, the fixed transparent conductor layer 12 is patterned into horizontal stripes 52 and the individual movable shutter coils 30 are connected together in columns 54 overlying the horizontal stripes. Each of the array pixels is therefore at the junction of one horizontal and one vertical electrode. In the rolled up position, a certain fraction of the light impinging on one side of the plane of the array is blocked by the rolls. For example, if the roll diameter is 40 microns, and the overall pixel size is 130×130 microns, then about 30% of the light is blocked by the rolls. When all the shutters are in the rolled out position, as shown in FIG. 4, there are small gaps between the shutters to provide some clearance. Light can pass through these gaps unless additional opaque stripes are provided in the substrate to block these openings. If the gaps are 4 microns wide, then without additional masking on a 130×130 pixel size, a 20 to 1 contrast ratio would be expected, assuming opaque shutters. With additional masking, much higher contrast ratios are possible. Also, a larger pixel size with the same roll diameter will give a larger contrast ratio.

Figure 6:
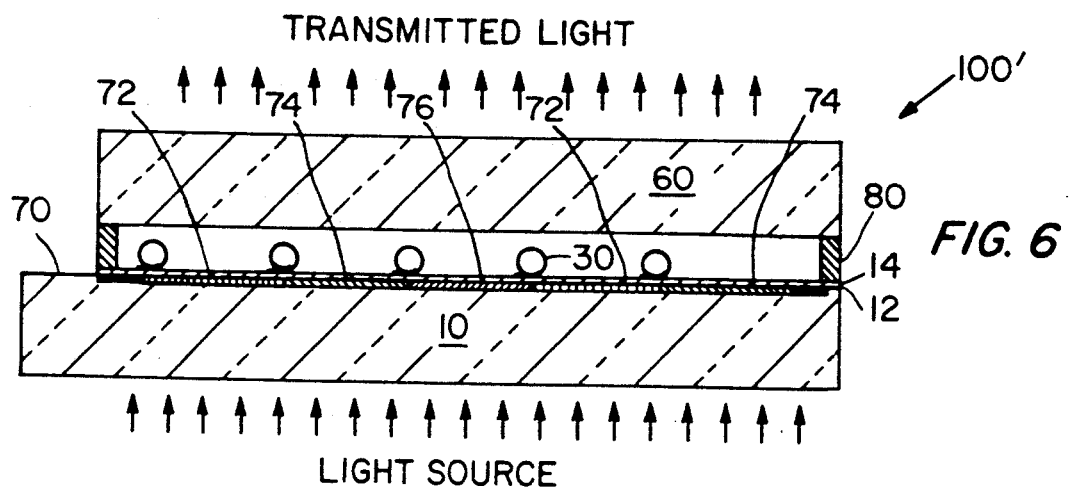
FIG. 6 is a schematic cross-sectional view of a transmissive mode color ELVD embodiment.
Figure 7:
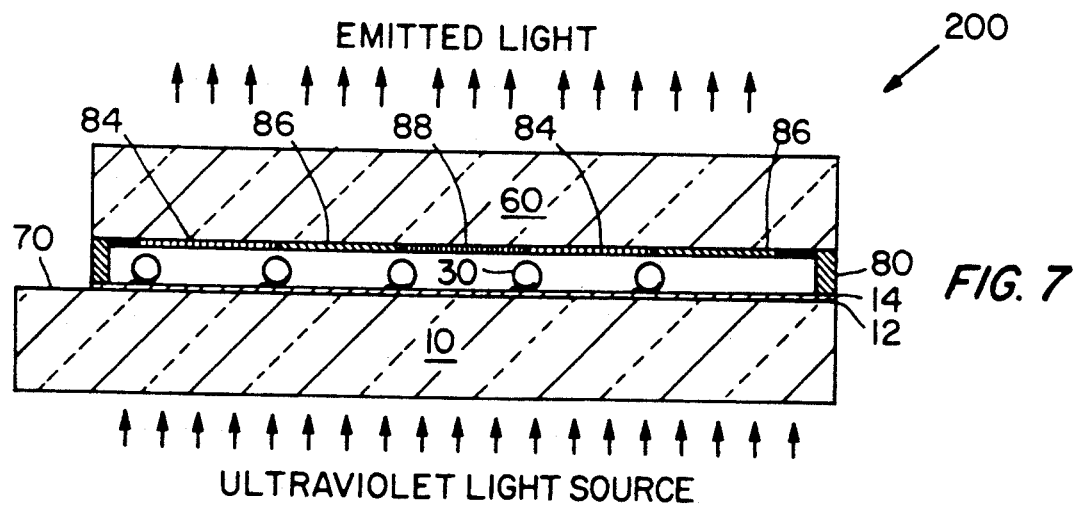
FIG. 7 is a schematic cross-sectional view of an active transmissive mode color ELVD embodiment.
Figure 8:
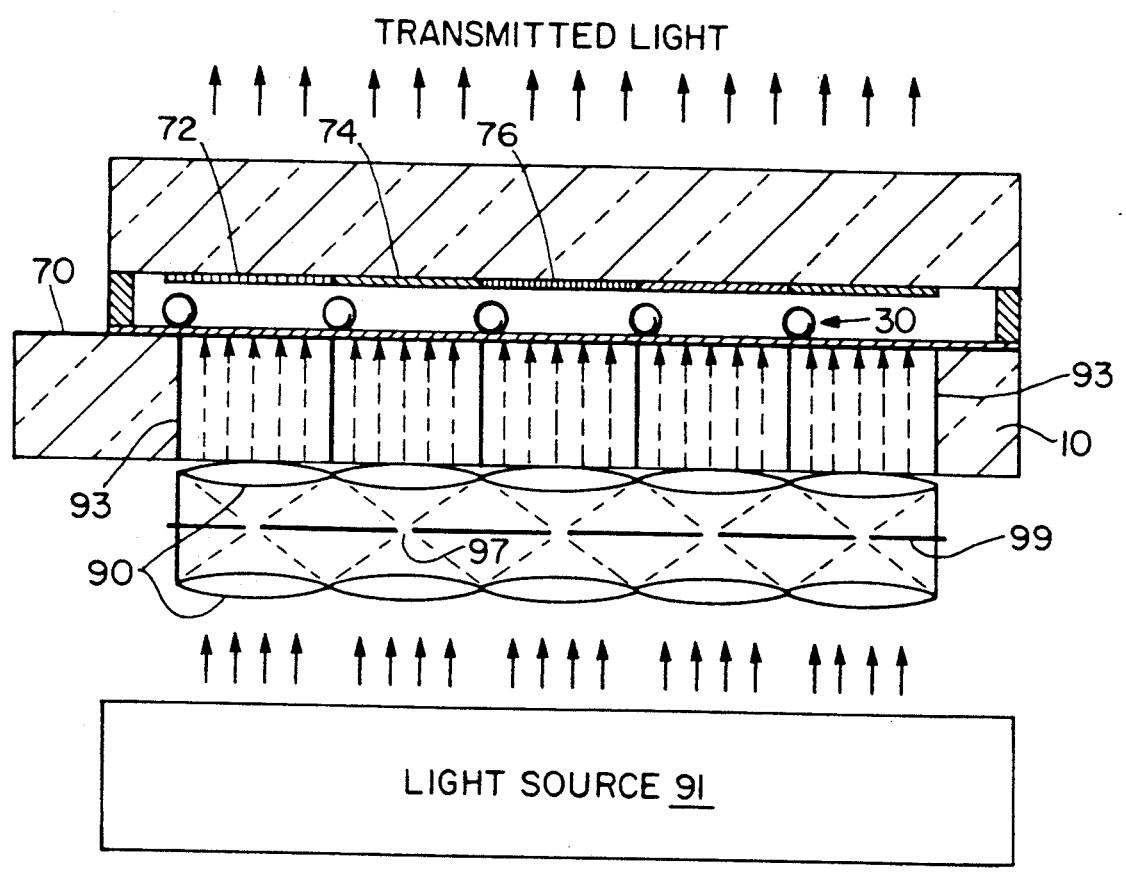
FIG. 8 is a schematic cross-sectional view of an ELVD with an array of lenslets to enhance contrast.
Figure 10:
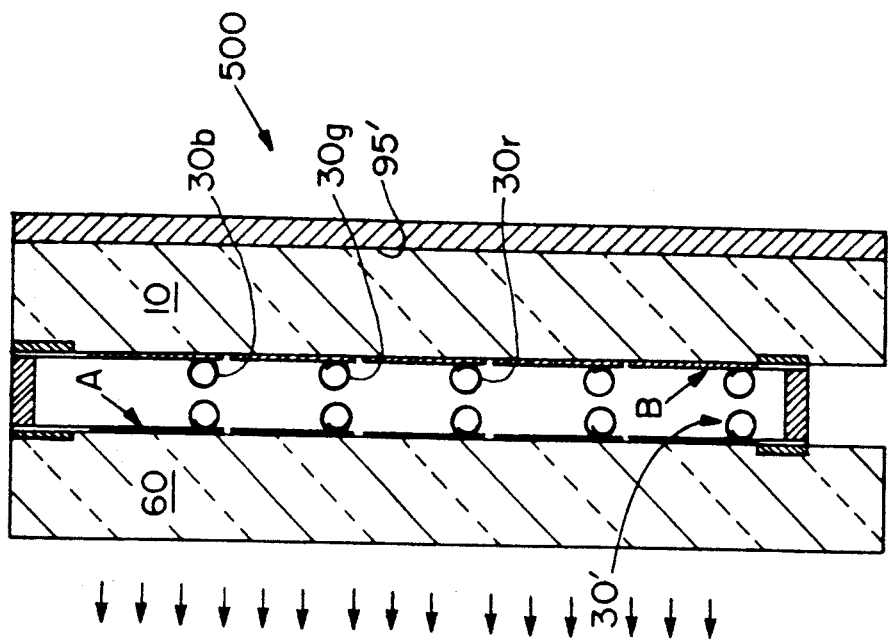
FIG. 10 is a schematic cross-sectional view of two shutter array ELVD operated in the reflective mode.
Figure 9:
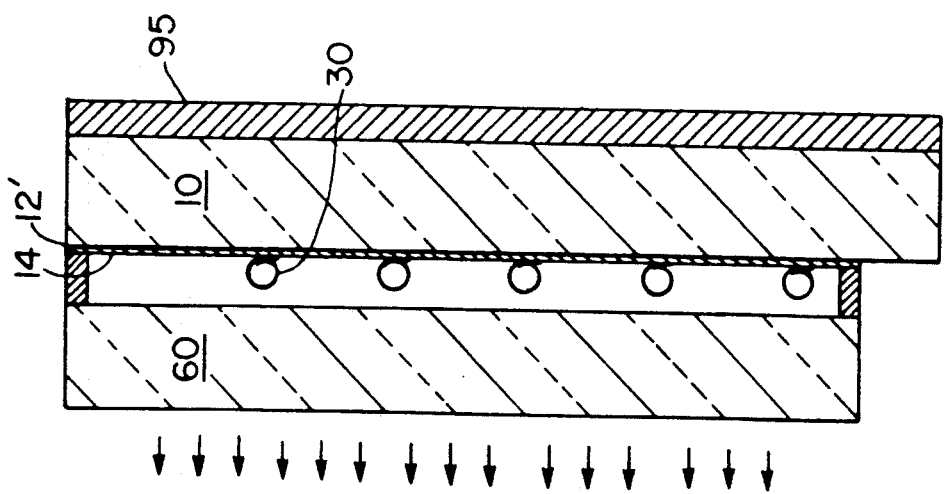
FIG. 9 is a schematic cross-sectional view of a reflective mode ELVD.

Light may pass through the display in either direction and a color display could be made by using color filters, as shown in FIG. 6, wherein a display array 100' is formed, as previously described, and packaged in a glass or quartz hermetically sealed container comprised of bottom glass substrate 10, sidewall spacers 80 and glass or quartz top wall 60. Red, green and blue filters 72,74,76, respectively, are bonded to the bottom of wall 60 and light is passed in the direction of the arrows. A second version of the color display is shown in FIG. 7, where ultraviolet light is supplied to one side of the display 200 and three ultraviolet light sensitive color phosphors 84.86.88 (red. green and blue. respectively) are positioned on the other side beneath wall 60 to produce an active display. Each coiled electrode 30 controls one color phosphor. This approach has the advantage that the amount of flicker can be controlled by the persistence time of the phosphor. To enhance the contrast of this display. an array of collimating or focusing lenslets 90 on the ultraviolet or light source side of the array. may be provided as shown in FIG. 8. These would serve to focus the light from a source 91 onto an aperture 97 through a shutter 30 onto its respective phosphor or respective filter 72',74', or 76'. Light absorbing barriers 93 could also be used to enhance contrast and reduce crosstalk. The design of these lenses could take advantage of the work in the field of binary optics. The array could also be used in the reflection mode, using a white background 95 and black shutters 30. as shown in FIG. 9. An even simpler reflection mode device may be made using an opaque white conductor 12', instead of the transparent conductor and eliminating the white reflective layer 95 behind the glass substrate 10. In a very advanced version, two shutter arrays A and B are stacked. as shown in FIG. 10. to produce a passive color display 500. The top array A has black shutters 30'. the intermediate array has three colors on the shutters (blue. green and red) 30b,30g,30r. and the background 95' is white. This provides a multicolor reflective display which is totally passive.

Figure 11:
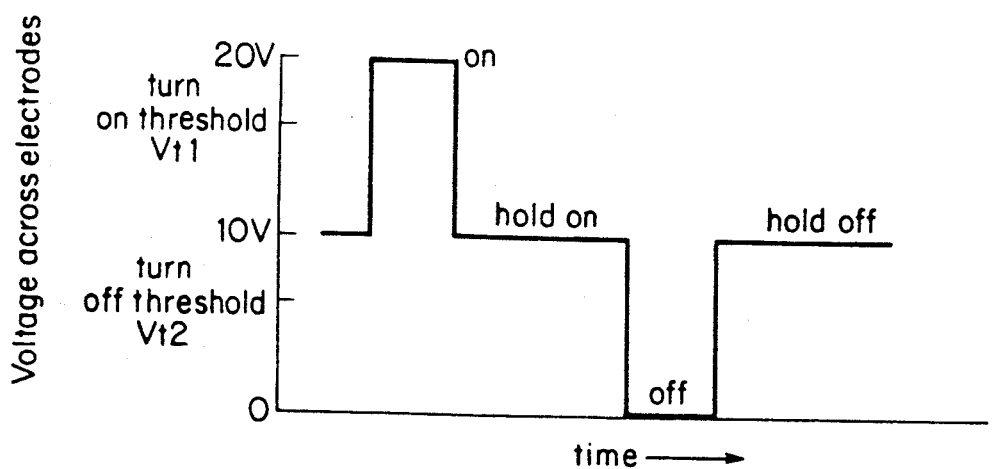
FIG. 11 is a timing diagram showing the applied DC voltages required for operation of the ELVD.
Figure 24:
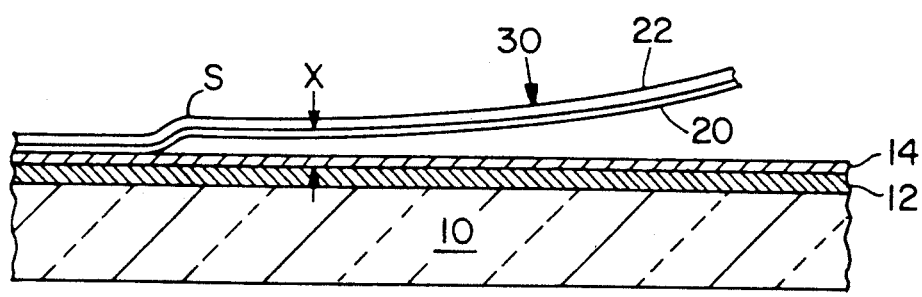
FIG. 24 is a magnified cross-section of an ELVD illustrating the stepped construction of the movable electrode.
Figure 25:
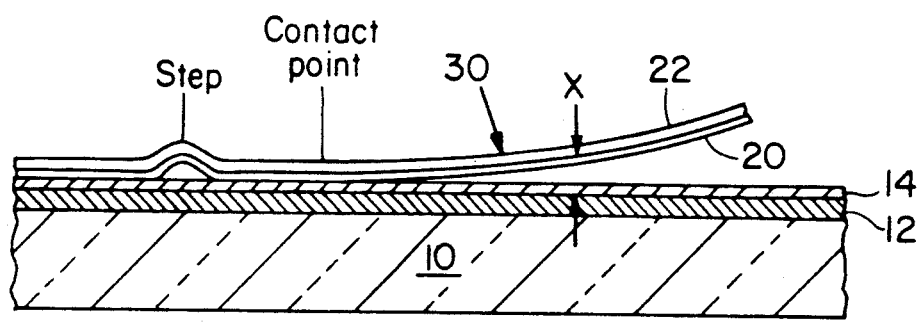
FIG. 25 is a section, as in FIG. 24, with the electrode further unrolled.

The power requirements for the display device of the invention are very small. The voltage required is in the range of 1 to 50 volts. There is essentially no DC current required. Most of the current is the very brief flow of charge as the shutter or coil closes or opens. This current charges the capacitance between the movable shutter electrode and the fixed electrode. The power required to close a shutter having a $364 \times 130$ micron pixel area 30 times a second is about $3 \times 10^{-8}$ watt. A high definition screen having 1000 rows and columns in color would have three million pixels. A $14 \times 16$ inch, 21 inch diagonal color display at a frame speed of 30 cycles per second. represents a power consumption for the entire screen of about only one-tenth of a watt. A representative waveform of the voltage across the two electrodes of the shutter required to turn on (roll out), hold, and turn off (roll up) the shutter. is shown in FIG. 11. When the voltage moves above the turn-on (or roll-out) threshold. the film electrode rolls out, and can be held out by a lower voltage. The reason the holding voltage is lower than the roll-out voltage is that a step is provided on the moveable electrode as will be explained in connection with FIGS. 24 and 25. Thus, for a given voltage on the two electrodes the electric field and, hence the force between the two electrodes, becomes larger as the coiled electrode moves closer to the transparent electrode. Therefore. once the movable electrode is rolled out, the voltage can be reduced and still retain enough field to hold the electrode down.

Figure 12:
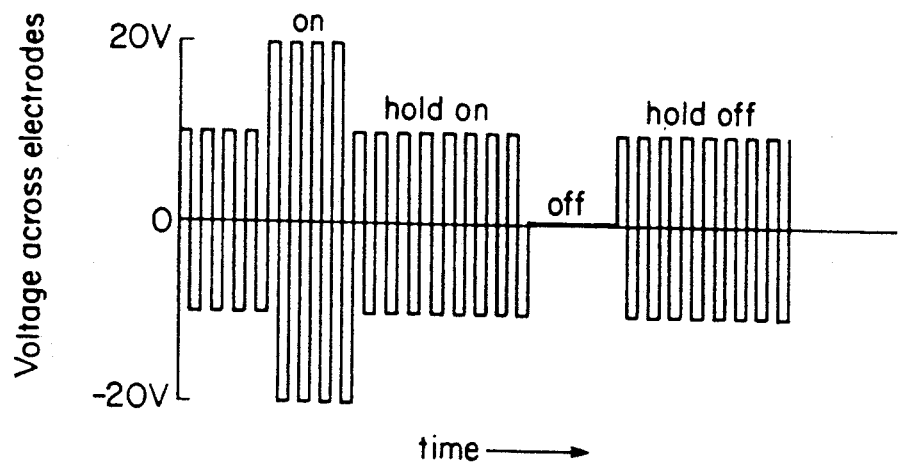
FIG. 12 is a timing diagram as in FIG. 11 for AC mode of operation.

Under some circumstances. it may be necessary to use an AC voltage to hold the electrode down, as shown in FIG. 12. The frequency of the AC voltage could vary widely depending on device design. A frequency of one cycle per second has worked well for minimizing drift, for some devices which have been fabricated. This is required if charge migration occurs through the two insulating films 14 and 20 [See FIG. 1(h)], which either causes the film to stick down or causes the threshold to shift. Using the AC voltage can increase the power consumption for some applications. but there will be substantially no increase for applications such as TV where the AC frequency used is 30 cycle/second or lower.

Figure 13:
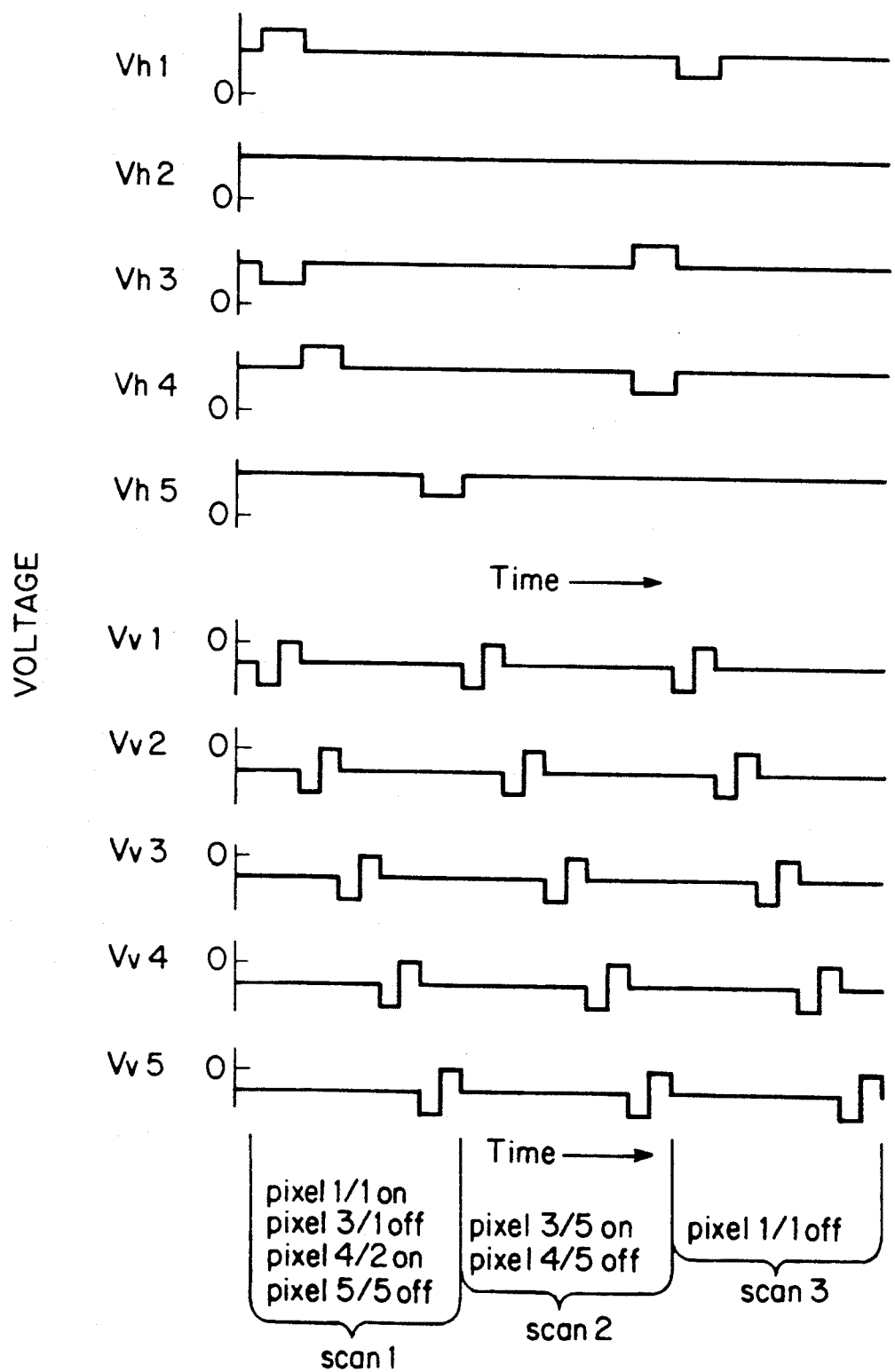
FIG. 13 is a timing diagram showing how the bistable nature of the ELVD can be used to switch pixels by employing a combination of vertical and horizontal applied voltages.

In a matrix. the bistable nature of the device can be used to great advantage. An example is given in FIG. 13 of the voltages used on the horizontal (h) and vertical (v) lines to switch individual pixels. The general idea is to maintain a bias voltage between the two coiled electrodes at every pixel which is halfway between the turn-on threshold and the turn-off threshold. This bias will hold whichever state the pixels are in. If one of the horizontal lines is raised in voltage. raising the voltage between the electrode pairs in that row. to just below the turn-on threshold. none of the previously Off pixels will switch On. If, however, at the same time, one of the vertical lines is lowered in voltage. which raises the voltage between the electrodes in that column, to just below the turn on voltage, none of the previously Off pixels will turn On. except the one at the intersection of vertical and horizontal lines. FIG. 13 shows three scans of the entire matrix, turning On or Off several pixels in each scan.

Figure 14:
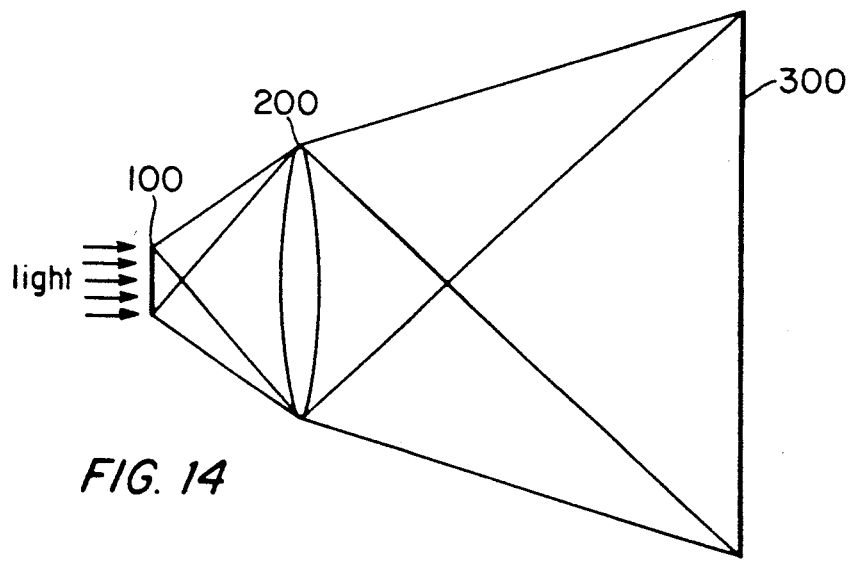
FIG. 14 is a schematic of a projection display using an ELVD.

Any of the shutters or shutter arrays previously described may be used in a projection system, as shown in FIG. 14. wherein light is focused on a matrix array of the invention 100 and an image is formed which is projected by projection lens 200 onto screen 300. Since the pixels are not very heat sensitive. a large amount of heat can be dissipated or reflected and therefore high-intensity light can be handled and projections onto very large screens is possible.

For proper operation of the electrostatic light valve displays of the invention. it is important to take into account the effect of the small DC current in addition to the capacitive charging current. when a voltage is applied across the electrodes. This current exists even though the electrodes are separated by one or, preferably, two insulators. The term insulator is misleading in this context, because one generally thinks of electrical insulators as non-conducting. In the present invention. a minimal current, as will be explained later, is present and can be desirable between the movable electrode and the fixed electrode to minimize power dissipation. For this reason. complete blocking of current is not required. Instead, the "insulators" previously described are actually formed of high resistivity materials which are used as part of the electrode in a way which reduces charge flow between the electrodes. These materials can have resistivities (which vary depending upon applied voltage and temperature) in the range of that of silicon dioxide, i.e., $10^{10}$–$10^{15}$ ohms-cm. or they can have resistivities considerably lower and still function to reduce the charge flow sufficiently.

High resistivity materials can have atoms in them, ionized impurities or defects, which are either fixed or mobile. Since high resistivity materials have few free electrons, the ions can be a large percentage of the total charge and have a major influence on the electric field. This fixed or mobile charge can give the material a permanent or slowly varying electric field which would result in threshold shift of the shutter electrodes. The turn-on voltage would be different for positive and negative voltages. Mobile ions, for example sodium in silicon dioxide, may also cause a threshold shift by moving to the silicon dioxide surface under the influence of the electric field and perhaps also from the movable to the fixed electrode when an electric field is present. If the ion effects become large, the fields caused by the ions can cause the electrode to stick down permanently. The ion effects can be minimized by choosing the right materials and high purities. Lower resistivity materials also have fewer ion effects.

Materials properties will therefore determine the proper design of the electrodes which must take into account charge flow and surface states. Some of the electrode design considerations and factors will now be discussed in connection with FIGS. 15-17 in which the structure of the rolled moveable electrode is shown as a flat electrode for simplicity of illustration. Note also that this discussion is based on a simplified theoretical analysis based on observation of experimental structures made in accordance with the invention. Other factors may be involved and the validity and usefulness of the present invention should not be premised on the accuracy of this theory.

Figure 15A:
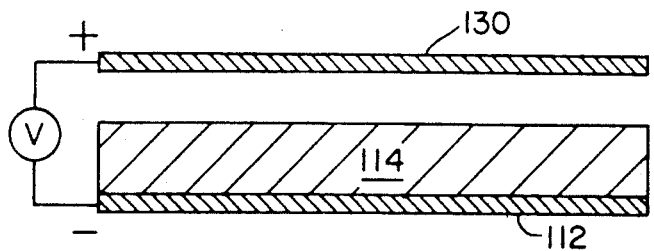
FIGS. 15(a)-(c) are cross-sectional views illustrating certain charge concepts of the invention.
Figure 15B:
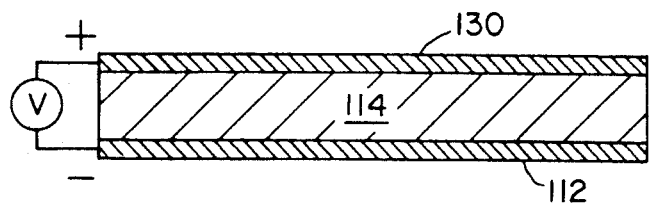
Figure 15C:
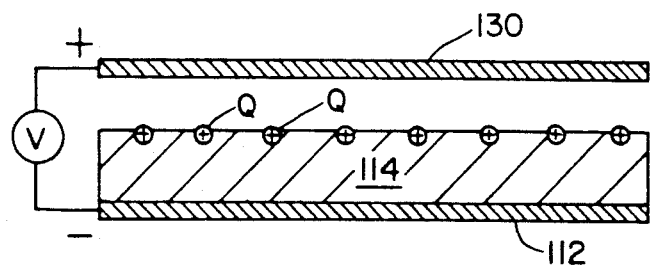

In general, if only one high resistivity layer 114, on either the movable 130 or fixed 120 electrode is used, as shown in FIGS. 15(a)-15(c), it is difficult to keep the electrode in the "rolled-out" position. During roll out, FIG. 15(a), the voltage provides a force due to the accumulation of charge on each electrode. As soon as the electrodes touch or come within about 100 Å, [FIG. 15(b)], however, charge Q can transfer from the metal to the surface of the high resistivity material 114, filling some of the surface states, and the force is reduced [FIG. 15(c)], and the electrodes can move apart or roll-up. This charge transfer can happen rapidly so that the movable electrode will barely begin to roll out before it rolls back up. In general, a single sheet of insulator 114 will not work because the movable electrode 130 will not roll out and stay rolled out. If the surface roughness between contacting surfaces is sufficiently large and keeps the two surfaces sufficiently far apart (>100 Å) over a sufficiently large area to block a large part of the charge transfer, the device can be made to operate and stay rolled out, since an electric field can exist across these air gaps and provide a force to hold down the rolled out electrode. The voltage required to roll out the shutter when there is an air gap will be higher than for an insulator without an air gap for the same conductor separation because the dielectric constant of the insulator is higher than the air gap. Thus, the disadvantage of the air gaps is that they tend to raise the operating voltage of the device. The problem of reduction of electric field due to charge transfer can also be avoided by using an AC, rather than a DC voltage, to roll out and hold out the movable electrode. Keeping the roll out flat requires a high enough frequency so that the field reverses after only a small amount of charge transfers and the roll does not roll back up to any significant extent between each field reversal. The AC mode of operation has the disadvantage that it requires more power for operation than the DC mode and may tend to cause more wear because parts of the roll may tend to oscillate at twice the applied frequency. Any of the metal atoms removed from the movable electrode, due to wear, will very likely be left behind on the high resistivity material adding to the surface charging effects.

Figure 16A:
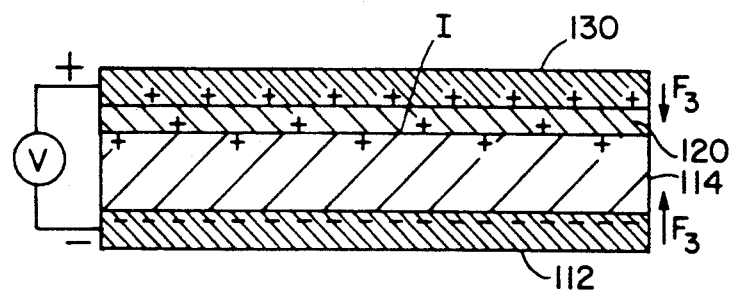
FIG. 16(a) is a cross-sectional view illustrating a two insulator embodiment of an ELVD in which the resistance $R_1$ of one insulator is less than the resistance $R_2$ of the other insulator.
Figure 16B:
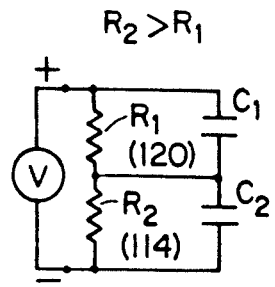
Figure 20:
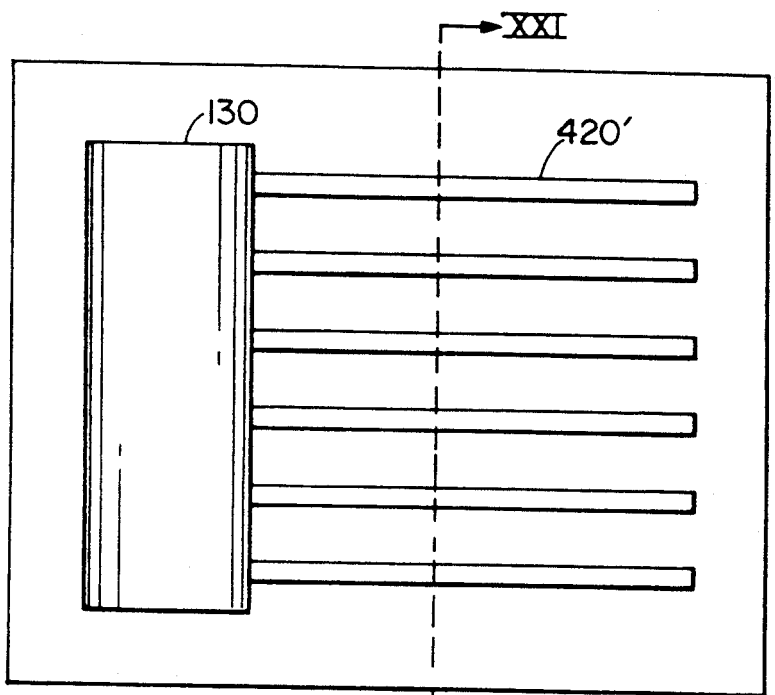
FIG. 20 is a schematic plan view of an ELVD pixel with bars or rails extending along the roll direction and wherein the movable electrode is rolled up.
Figure 21:
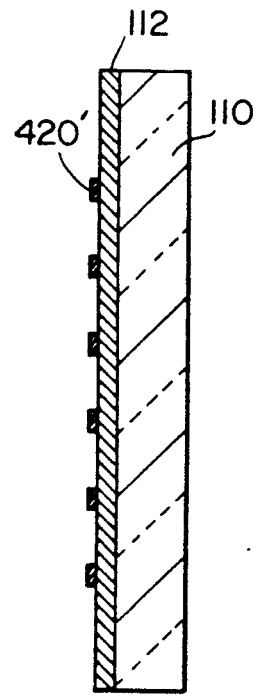
FIG. 21 is a section along lines XX—XX of FIG. 20.
Figure 22:
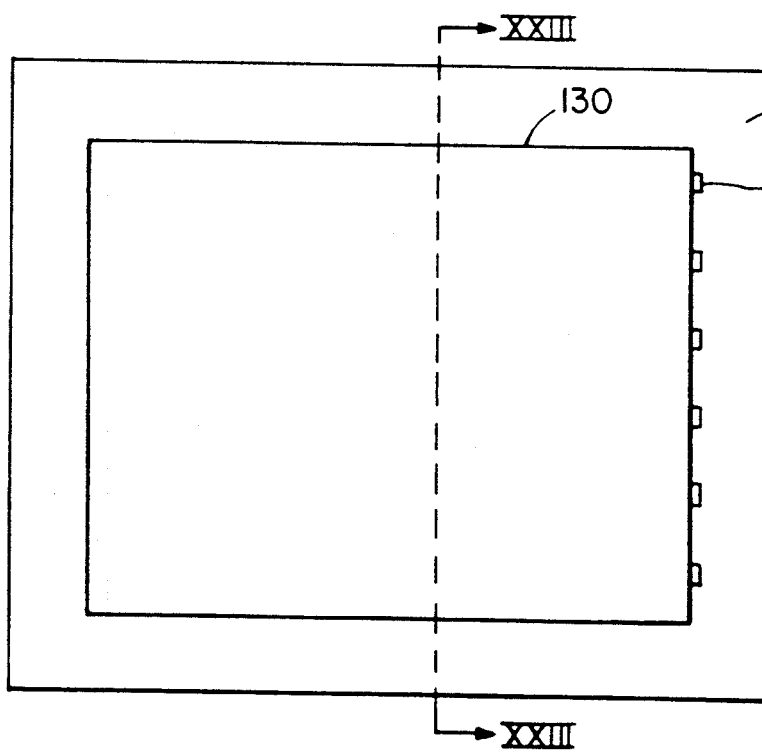
FIG. 22 is a schematic as in FIG. 20 with the electrode unrolled.
Figure 23:
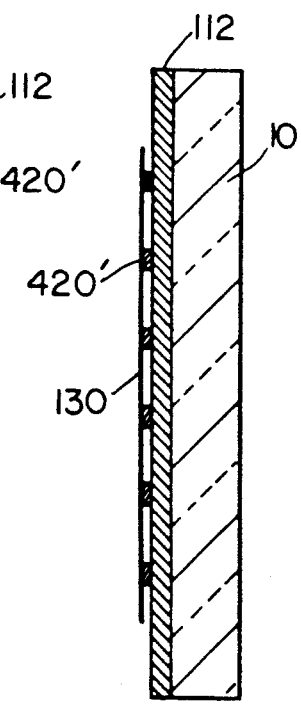
FIG. 23 is a section along lines XXII—XXII of FIG. 22.

By fabricating the electrodes with high resistivity material on the contacting surfaces of both electrodes, as shown in FIG. 16(a), it is possible to reduce or avoid the charge transfer, since the charge accumulation is reduced at the electrode interface, as illustrated in FIG. 16. In FIG. 16, the electrodes 130/112 are constructed so that the same high resistivity material 114/120 is used on each electrode and one material (114) is thicker than the other (120). The resistance per unit area perpendicular to the surface of the two electrodes is different, as shown in the assumed equivalent circuit [FIG. 16(b)]. $R_2 > R_1$. Note that in the equivalent circuit $C_1$ and $C_2$ represent the capacitance between interface I and the respective conductors 130 and 112. The surface states at the contacting interface "I" therefore will accumulate a net charge and charge up to a potential closer to that of the electrode having the thinner high resistivity material, i.e., electrode 130. The force between the electrodes will therefore reduce with time after contact, except that the charging time is much slower than for the FIG. 15 case. Therefore, the force will fall more slowly. The force will also not fall as far, because the potential of the surface states will not reach the level of the applied voltage. For this case, the holding voltage required to keep the roll rolled out, will drift upward. The drift in holding voltage can again be avoided by using an AC voltage, but with a considerably lower frequency than for the device of FIG. 15(a).

For FIG. 17(a), the resistivity of high resistivity materials 114'/120' have been chosen so that $R_2 = R_1$ for the given thicknesses of the two different materials. This configuration will not accumulate any net surface charge, and will therefore not have a holding voltage drift. This will provide for long term DC operation which has the advantage of the lowest power dissipation and simpler drive electronics. This, of course, assumes there is also negligible mobile ion drift in the high resistivity material.

In FIG. 18(a), $R_2$ is made equal to $R_1$ by using the same thickness on each electrode. This has the advantages of FIG. 17(a) with a simpler structure, since fewer materials are used but may be difficult to achieve in practice.

The DC and AC roll out effects described above have been observed experimentally for both single and double insulator case using silicon as the lower electrode, silicon dioxide or silicon nitride as the high resistivity material bonded to either the silicon or to the moveable electrode and with tungsten as the metal in the movable electrode. Despite these disadvantages, AC operation is preferred because it simplifies the control of material properties for the two insulator case during fabrication.

FIGS. 19(a) and 19(b) illustrate an embodiment wherein much of the high resistivity material has been eliminated. Standoffs or rails 420 made of $SiO_2$, or other high resistivity material, support the movable electrode 130 when it is in a rolled down position [FIG. 19(b)] so that most of the area between electrodes is a gap between electrodes filled with gas or vacuum. The air gap in this case is uniform and carefully controlled and results in a contact plane with almost no surface state charging at the interface I resulting in a reduction of the charge problems associated with a solid insulator. The stand offs 420 may consist of narrow ribs of silicon nitride or silicon dioxide running perpendicular to the roll direction. To provide better damping, the insulating ribs, could also be made out of plastic which has greater flexibility than silicon dioxide or silicon nitride. To reduce the charge problems attributed to the solid insulators even more, one could coat the tops of the solid insulators 420 with metal 422 [FIGS. 19(a),(b)]. The metal would then charge up to the potential of the moving electrode 130 each time it rolled out, which would eliminate the drift in voltage. The metal on top of the rail could also be permanently electrically connected to the moveable electrode. One could also have extra high resistivity material between the rails and/or on the moving electrode for some applications. Note that material located between the rails must be thinner than the rails in order to maintain a gap.

An alternate geometry for the stand off embodiment is shown in FIGS. 20-23 in which the rails 420' run in the roll direction along the fixed electrode 112 over the glass substrate 110. In this geometry the movable electrode 130 is planar on the fixed electrode side in order to have the roll out motion smoother and have less friction.

For many applications, it is desirable to have a bistable display device, that is, one in which the "hold-on" voltage is less than the voltage required to initially turn the shutter on. This is especially useful in x y scanned arrays, which would be used to make a television display screen, for example. This bistability can be created by forming a step S in the movable part of the movable electrode 30 (formed of stressed conductor 22 and insulator film 20) near the place where it is bonded to the insulator 14 on the fixed electrode 12, as in FIG. 24. The step S increases the distance "x" between the electrodes which increases the voltage required to begin to roll out the electrode. The amount of voltage required can be controlled by the step height. Once the coil begins to unroll, as in FIG. 25, the distance "x" between electrodes is less, so that less voltage is required to roll out the electrode. It is therefore possible to use a pulse, as previously shown in FIG. 11, to unroll the coil where the initial part of the pulse has a larger voltage which drops down for the rest of the pulse. The minimum voltage required to begin the unrolling is Vt1 and the minimum voltage required to continue the unrolling is Vt2. As long as the voltage between the electrodes stays above Vt2, the coil will stay most of the way rolled out. For any voltage between Vt2 and Vt1, the coil position will remain unchanged, either in the rolled up or rolled out position. If the voltage is at any point dropped below Vt2, the coil will roll up. One could, of course, introduce additional steps along the coil which would require exceeding threshold for that step before the coil could roll beyond that step.

Grey scale can be provided by partially rolling out the shutter or by using time multiplex and the natural persistence of the human eye to give the appearance of gray. For example, in an application for TV, the frame time is 1/30 of a second. Since the shutters switch very rapidly, they can be turned on and off in 1/10,000 of a second or faster. By leaving a shutter on for only a fraction of the frame time, the appearance of grey scale can be achieved at each pixel.

Figure 26A:
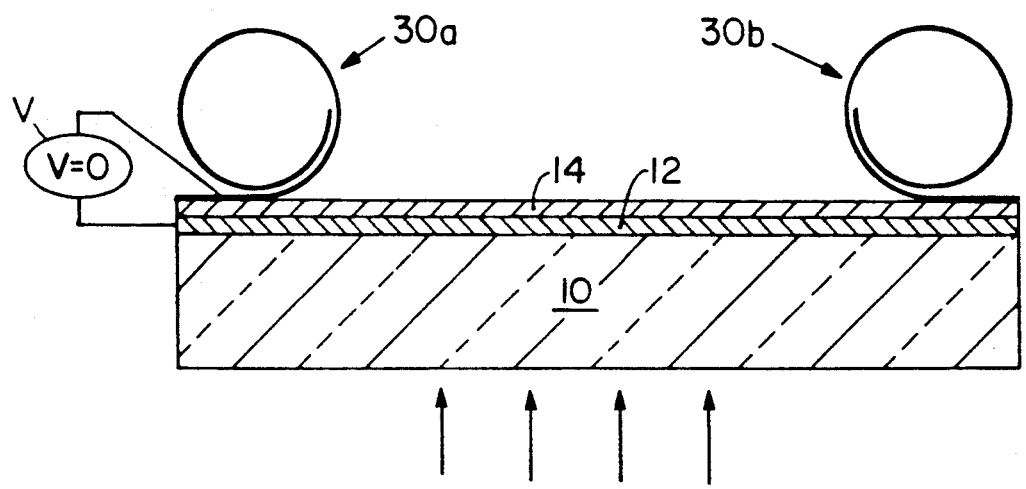
FIG. 26(a) is a cross-sectioned view of a multicolor display
Figure 26B:
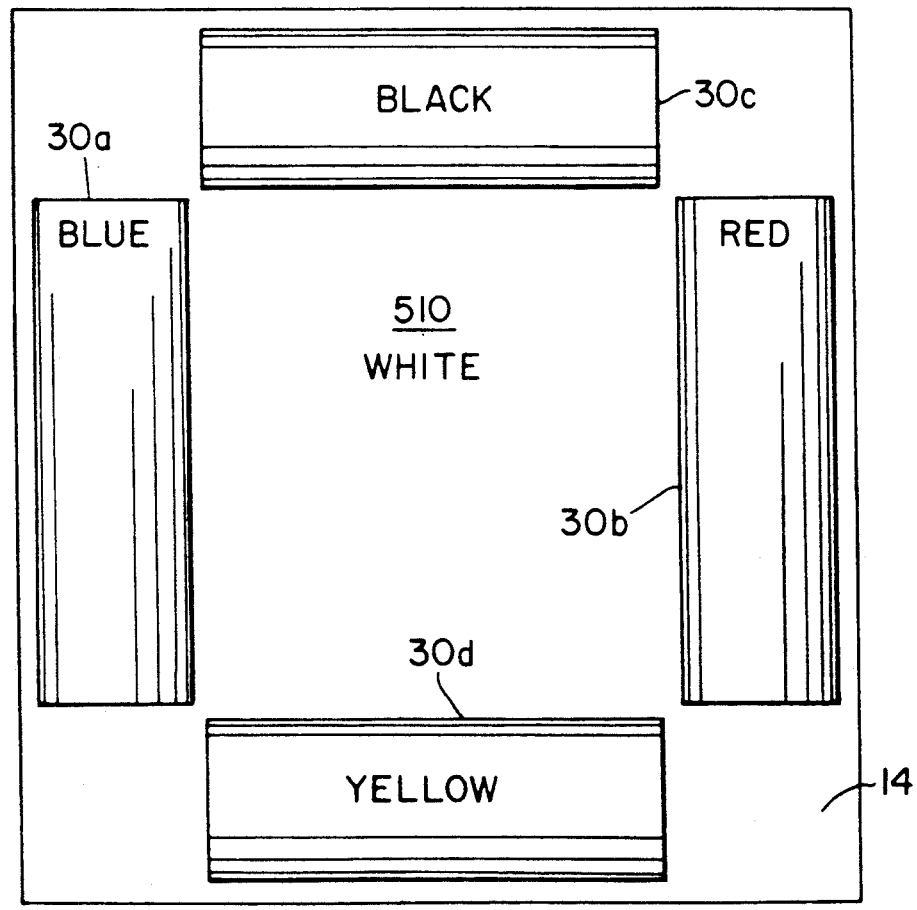
FIG. 26(b) is a plan view of the display of FIG. 29.

In the embodiment of FIGS. 26a and 26b a passive multicolored bistable electrostatic light valve display is depicted wherein a plurality of coiled moveable electrodes 30a-30d of the type previously described are symetrically disposed about a central display area 510.

The moveable electrodes 30a-30d are each affixed at one end to insulator layers 14 formed on white electrical conductor 12 formed on an insulating substrate 10.

Individual moveable electrodes 30a-30d may be selectively activated, one at a time, by applying voltage from source V across selected electrodes to vary the color of the light reflected back to a viewer on the substrate side. Arrays of such displays may be provided to produce a passive color display.

Figure 27A:
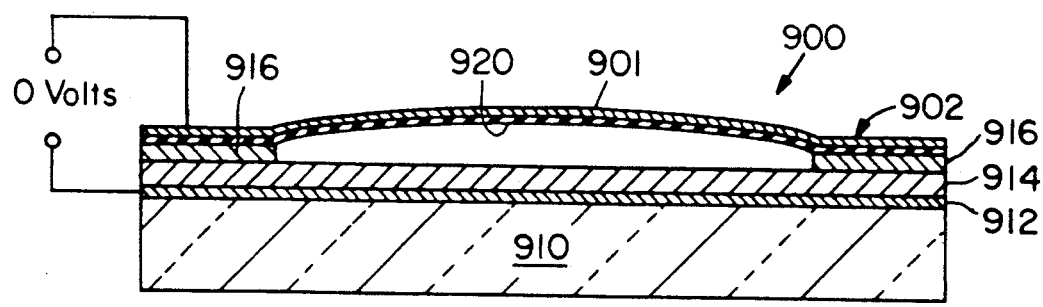
FIGS. 27(a) and 27(b) are cross-sectional views of a deformable membrane switch (DMS) display embodiment operating in the reflective mode showing the switch Off [FIG. 26(a)] and On [FIG. 26(b)].
Figure 27B:
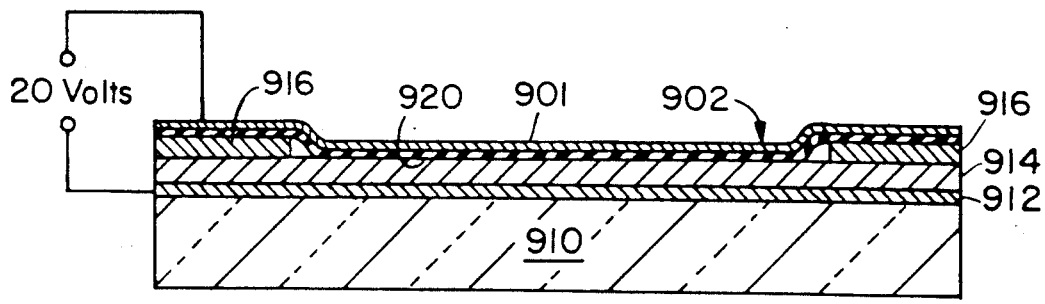
Figure 28A:
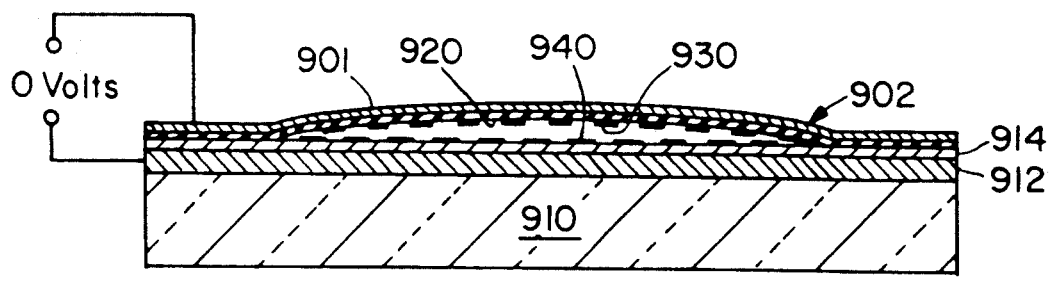
FIGS. 28(a) and 28(b) show an alternate embodiment of a DMS in the Off and On positions, respectively.
Figure 28B:
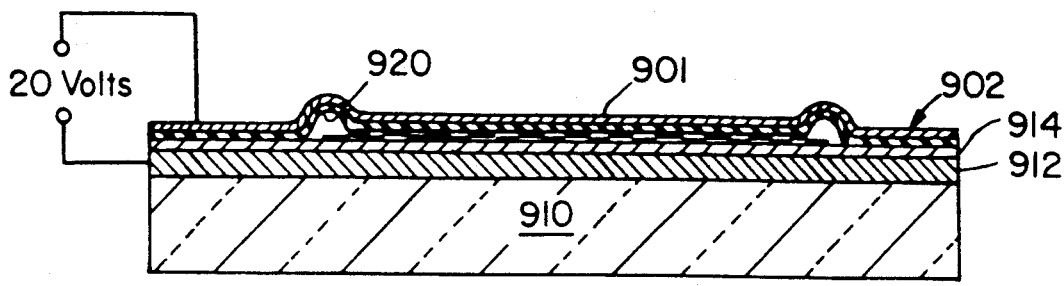

An alternate embodiment will now be described in connection with FIGS. 27(a) and 27(b) which shows a deformable membrane switch (DMS) 900 operating in the reflective mode in schematic cross-section form. A membrane 902 is shown curved upward in the "up" position. Membrane 902 is formed of a transparent conductor 901 disposed on top of an insulator 920 and bonded at its two lateral edges to an optional insulator support 916. Support 916 is disposed on insulator 914 which is formed on opaque conducting layer 912, deposited on glass substrate 910. In this "up" position, membrane 902 can be made to look white or the color of conductor layer 912 when viewed from above. In FIG. 27(b), a voltage i.e. 20 volts is applied across the electrodes 902 and 912 causing most of the membrane 902 to lie flat against the insulating layer 914 and look blue or black from the top because electrode 902 forms an antireflection coating on the opaque conducting layer 912. Membrane electrode 902 is biased in the upward position by anisotropic stress or anisotropic stiffening using the principles set forth previously with respect to the coilable electrode. As with the previous embodiments, the operation of the deformable membrane switch 900 depends on a voltage applied to two electrodes. One electrode is the membrane 902, the other is the conducting layer 912. Starting with zero volts applied the membrane is in the "up" position and has an upward curvature due to the stresses or stiffening built into the membrane film or because it was fabricated with that shape. When the voltage is above the turn-on threshold, the membrane moves down into contact with the insulating surface 914. Once the membrane is in the down position, the voltage can be lowered and the membrane 902 will remain in the "down" position, as long as the voltage remains above the turn-off threshold. As with the previous embodiments, the DMS is a bistable device. This device can also be used in the transparent mode with a transparent substrate where the motion of the membrane causes a change in color due to dielectric constant differences and interference effects. A second version is shown in FIGS. 28(a) and 28(b). In this version, the device can be illuminated from the back. An array of opaque stripes 940 is formed on insulator 914 on a transparent lower electrode 912 and a second array of opaque stripes 930 is formed on the movable electrode 902. The arrays are staggered so that the stripes on the upper electrode 902 fit in the gaps of the lower electrode 912. With the membrane 902 in the up position, light can pass through the valve by diffraction and reflection through the slits, and with the membrane in the lower position, light is substantially blocked. The membrane 902 and other elements of the DMS may be formed of materials and using processes previously described in connection with the ELVD embodiments.

Equivalents

This completes the description of the preferred embodiments of the invention. Those skilled in the art will recognize, or be able to ascertain, using no more than routine experimentation, many equivalents to the specific embodiments of the invention described herein.

These and all other equivalents are intended to be encompassed by the following claims.

For example, the electrode film structure can be made to have a variety of different optical properties depending on the application. It can be opaque and highly reflective, it can be opaque and absorbing or black, it can be opaque and white or a color, or it can be transparent to light of a certain color. The substrate can be either opaque or transparent or have a color, depending on the application. An array of these devices can be used as an electronic display. These devices can also be used in most applications where light valves are used. For example, they can be used in a printing machine similar to a laser printer, except that instead of a scanned laser, a row of valves is used.

The anisotropic property, required to roll the film in a preferential direction, may be anisotropic stress or anisotropic stiffness or a combination of both. One method of providing anisotropic stiffness, which has been described, is to make the film structure corrugated. The corrugations run perpendicular to the roll direction. This corrugated structure can be created by depositing the film over a surface which contains ridges and valleys. The ridges may have a uniform periodicity or they could have an irregular, nonuniform or gradually changing periodicity. Since uniform ridges tend to diffract light and separate colors, nonuniform ridge spacings may be used to avoid color diffraction effects from the closed shutter. Changing the periodicity of the corrugations along the length of the shutter is also a way to change the flexibility slightly along the length of the shutter. This variation of flexibility occurs because closer ridges mean a longer film length per unit shutter length parallel to the roll direction and perpendicular to the ridges.

While thin films and thin film processes are preferred for implementation of the invention it may be possible to fabricate suitable films using processes which strictly speaking may not qualify as thin film processes, such as, spin-on or spray-on techniques for forming films.

The resist baking process described herein is not limited to a high temperature (400° C.) process. Lower bake temperatures i.e. in the range of 150° C. to 190° C. are possible provided subsequent film deposition processes are kept below the bake temperature.

If a low temperature resist bake process is used the resist can be removed by an organic stripper or solvent but care must be taken to avoid damaging the shutters while rinsing and drying the structure. This low temperature process obviates the need for a down stream asher process with atomic oxygen and thereby avoids possible deterioration of shutters by reaction of shutter material with the oxygen.

In some applications, it may be desireable to dispose lubricants, such as, silicone or fluorocarbons inside the sealed displays to reduced sticking of the shutters. The insulators on the electrodes may be transparent or may be colored depending upon the mode of operation and the application. Strong tensile strength ribs may be formed on top of the moveable electrode extending in the roll direction to anisotropically stress the electrode. Or, conversely, strong compressive ribs may be formed on the insulator side of the moveable electrode for the same purpose.

We claim:

1. An electrostatic light valve comprising:
a) a fixed electrode formed on a substrate;
b) a first high resistance layer on said fixed electrode;
c) a movable electrode formed with an anisotropic stress in a predetermined direction and disposed adjacent said fixed electrode with a second high resistive layer formed between the movable electrode and the first high resistance layer; and
d) wherein the fixed electrode, high resistance layers and movable electrode are portions of a monolithic thin film structure and the movable electrode is formed of two layers of metal, one of which is nearer the substrate and is formed with compressive stress and the other of which is formed with tensile stress.

2. The valve of claim 1 wherein the resistive layers have a thickness and the resistance of regions of the resistive layers perpendicular to the thickness is equal.

3. The valve of claim 2 wherein the thickness of the resistive layers is equal.

4. The valve of claim 1 wherein the movable electrode is corrugated.

5. The valve of claim 1 wherein the movable electrode is coiled in a roll after formation and is anisotropically stressed in the direction of roll.

6. The valve of claim 5 further including spacer rails between the fixed and movable electrode.

7. The valve of claim 6 wherein the rails extend along the roll direction.

8. The valve of claim 6 wherein the rails extend transverse the roll direction.

9. The valve of claim 1 wherein the movable electrode is formed of a film having compressive stress on a side facing the fixed electrode and tensile stress on an opposite side of the film.

10. The valve of claim 1 wherein the movable electrode is coiled in a roll and unrolls in a first direction when a voltage is applied across the electrodes and has anisotropic stress in the direction of roll.

11. The valve of claim 1 wherein the movable electrode is formed of a conductive film having a thickness of less than about 3000 Angstroms.

12. The valve of claim 1 wherein the fixed electrode is comprised of a thin layer of material from the group comprising indium, tin, gold, silver, platinum or tungsten.

13. The valve of claim 1 wherein the first high resistance layer is formed of material from the group comprising silicon dioxide or silicon nitride.

14. The valve of claim 1 wherein the net stress of the two layers of the movable electrode is low compared with the stress of each of said two layers.

15. The valve of claim 1 wherein the movable electrode is formed into a roll and an electric potential applied across the electrodes unrolls the movable electrode.

16. The valve of claim 1 wherein the two layers are formed of material from the group comprising tungsten, chromium, titanium, magnesium or aluminum.

17. The valve of claim 1 wherein the light valve is a monolithic structure formed of thin films and wherein the movable electrode is formed on the second high resistive layer.

18. An electrostatic light valve comprising:
a) a fixed electrode formed on a substrate;
b) a first high resistance layer on said fixed electrode;
c) a movable electrode formed adjacent said fixed electrode and coiled in a roll after formation and anisotropically stressed in the direction of roll with a second high resistive layer formed between the movable electrode and the first high resistance layer; and
d) wherein the fixed electrode, high resistance layers and movable electrode are portions of a monolithic thin film structure and the movable electrode is formed of two layers of metal, one of which is nearer the substrate and is formed with compressive stress and the other of which is formed with tensile stress.

19. The valve of claim 18 wherein the net stress of the two layers of metal is low compared with the stress of each of said two layers.

20. The valve of claim 18 wherein the two layers are formed of material from the group comprising tungsten, chromium, titanium, magnesium or aluminum.

21. The valve of claim 18 further including spacer rails between the fixed and movable electrode.

22. The valve of claim 21 wherein the rails extend along the roll direction.

23. The valve of claim 21 wherein the rails extend transverse the roll direction.

* * * * *